US012693500B2

(12) United States Patent　　　　(10) Patent No.:　　US 12,693,500 B2
Meng et al.　　　　　　　　　　　　(45) Date of Patent:　　　　Jul. 28, 2026

(54) TERMINAL DEVICE AND LENS ASSEMBLY

(71) Applicant: BEIJING XIAOMI MOBILE SOFTWARE CO., LTD., Beijing (CN)

(72) Inventors: Jie Meng, Beijing (CN); Zhidong Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 334 days.

(21) Appl. No.: 18/244,211

(22) Filed: Sep. 8, 2023

(65) Prior Publication Data

US 2024/0402465 A1　　Dec. 5, 2024

(30) Foreign Application Priority Data

May 31, 2023　(CN) ......................... 202310637847.X

(51) Int. Cl.
　G02B 13/00　　　　(2006.01)
(52) U.S. Cl.
　CPC ................................... G02B 13/002 (2013.01)
(58) Field of Classification Search
　CPC .... G02B 13/002; G02B 9/64; G02B 13/0045;
　　　　　G02B 13/02; G02B 13/0065; G02B
　　　　13/00; H04N 23/50; H04N 23/55; H04N
　　　　　　　　　　　　　　　　　　23/57
　See application file for complete search history.

(56) References Cited

U.S. PATENT DOCUMENTS 6,747,813 B2 *　6/2004　Wakai ................ G02B 26/0825
　　　　　　　　　　　　　　　　　　　348/347

6,833,966 B2 *　12/2004　Nishioka .............. G02B 5/1828
　　　　　　　　　　　　　　　　　　　359/846
2017/0023769 A1 *　1/2017　Jo ....................... G02B 13/0045
2019/0049699 A1 *　2/2019　Tabata ................... G02B 13/02
2019/0243112 A1 *　8/2019　Yao ........................... G02B 9/60
2020/0073028 A1 *　3/2020　Shigemitsu .............. G02B 5/04
　　　　　　　　　(Continued)

FOREIGN PATENT DOCUMENTS

CN　　　　112162385 A　　1/2021
CN　　　　113433654 A　　9/2021
　　　　　　　(Continued)

OTHER PUBLICATIONS

Examiner provided machine translation of Kishida, JP 2021047325 A (Year: 2021).*

(Continued)

*Primary Examiner* — Balram T Parbadia
(74) *Attorney, Agent, or Firm* — Arch & Lake LLP; Hao Tan; Shen Wang

(57)　　　　　ABSTRACT

The present disclosure relates to a terminal device and lens assembly. The terminal device includes a first plate body and a first lens assembly. The first plate body has a light-transmitting area. The first lens assembly includes a prism, lens group, light-sensitive element and diaphragm, the prism has an object-side surface and image-side surface, light transmitted through the light-transmitting area sequentially transmits through the object-side surface of the prism, the image-side surface of the prism and the lens group and is irradiated to the light-sensitive element. An optical axis of the lens group is not parallel to a vertical line of the light-transmitting area. The diaphragm is provided between the image-side surface of the prism and the lens group.

20 Claims, 11 Drawing Sheets

(56)         References Cited

U.S. PATENT DOCUMENTS

| | | | | | |
|---|---|---|---|---|---|
| 2021/0048649 | A1* | 2/2021 | Goldenberg | ....... | G02B 13/0065 |
| 2021/0072515 | A1* | 3/2021 | Chang | ................... | G02B 17/08 |
| 2021/0364738 | A1* | 11/2021 | Huang | .............. | G02B 13/0065 |
| 2022/0035125 | A1* | 2/2022 | Yang | ........................ | G02B 3/04 |
| 2022/0035131 | A1 | 2/2022 | Ke et al. | | |
| 2022/0091395 | A1* | 3/2022 | Huang | .................... | G03B 5/00 |
| 2022/0196987 | A1 | 6/2022 | Zhang et al. | | |
| 2022/0206273 | A1 | 6/2022 | Li et al. | | |
| 2023/0132659 | A1* | 5/2023 | Shabtay | ................... | G02B 9/64 |
| | | | | | 359/733 |
| 2023/0194833 | A1* | 6/2023 | Kim | ....................... | G02B 13/16 |
| | | | | | 359/692 |
| 2024/0085603 | A1* | 3/2024 | Yoo | ........................ | G02B 5/003 |

FOREIGN PATENT DOCUMENTS

| | | | |
|---|---|---|---|
| CN | 115469445 A | 12/2022 | |
| CN | 115793190 A | 3/2023 | |
| EP | 3444650 A1 | 2/2019 | |
| JP | 2010151861 A | 7/2010 | |

OTHER PUBLICATIONS

Extended European Search Report issued in Application No. 23199941.8 dated Feb. 27, 2024, (8p).

CN First Office Action issued in Application No. 202310637847.X dated Dec. 19, 2025, with English translation, (22p).

* cited by examiner

TERMINAL DEVICE AND LENS ASSEMBLY

CROSS-REFERENCE TO RELATED APPLICATION

The present disclosure claims the priority to Chinese Application No. 202310637847.X filed on May 31, 2023, the contents of which are incorporated herein by reference in their entireties for all purposes.

BACKGROUND

Currently, the portable terminal device has become smaller and smaller. At the same time, various brands improve the camera performance of the terminal device in order to enhance the competitiveness of their products.

At present, in order to ensure that the terminal device has a good camera performance, a relatively large number of lenses are generally provided in the lens assembly of the terminal device, and more than one of the lenses are stacked in the thickness direction of the terminal device, which results in a larger size of the terminal device in the thickness direction thereof. This is not conducive to the miniaturization of the camera module.

Therefore, how to ensure that the terminal device has a good camera performance while being miniaturized is a problem that needs to be solved urgently.

SUMMARY

The present disclosure relates to the field of optical imaging technology, and in particular, to a terminal device, a lens assembly and a camera module.

According to a first aspect of the present disclosure, some embodiments provide a terminal device including a first plate body and a first lens assembly, in which:

the first plate body has a light-transmitting area;

the first lens assembly includes a prism, a lens group, a light-sensitive element and a diaphragm, the prism has an object-side surface and an image-side surface, light transmitted through the light-transmitting area sequentially transmits through the object-side surface of the prism, the image-side surface of the prism and the lens group and is irradiated to the light-sensitive element, and an optical axis of the lens group is not parallel to a vertical line of the light-transmitting area; and the diaphragm is provided between the image-side surface of the prism and the lens group.

According to a second aspect of the present disclosure, some embodiments provide a lens assembly including a prism, a lens group, a light-sensitive element and a diaphragm, in which:

the prism has an object-side surface and an image-side surface;

light transmitted through the prism sequentially transmits through the object-side surface of the prism, the image-side surface of the prism and the lens group and is irradiated to the light-sensitive element, and an optical axis of the lens group is not parallel to an optical axis of the object-side surface of the prism; and the diaphragm is provided between the image-side surface of the prism and the lens group.

According to a third aspect of the present disclosure, some embodiments provide a camera module including the lens assembly as described in the second aspect and the possible implements thereof.

It should be understood that the above general description and the following detailed description are exemplary and explanatory only and do not limit the present disclosure.

BRIEF DESCRIPTION OF THE DRAWINGS

In order to more clearly illustrate the technical solutions in the embodiments of the present disclosure, the accompanying drawings to be used in the description of the embodiments will be briefly introduced below, and it would be obvious that the accompanying drawings in the following description are only some of the embodiments of the present disclosure, and that for a person skilled in the art, other accompanying drawings can be obtained based on these drawings without creative work.

DETAILED DESCRIPTION

In order to make the purpose, technical solution and advantage of the present disclosure clearer, embodiments of the present disclosure will be described in further detail below in conjunction with the accompanying drawings.

Unless otherwise defined, the technical or scientific term used herein shall have the ordinary meaning understood by a person skilled in the art to which the present disclosure belongs. The terms "first", "second", "third" and the like used in the specification and claims of the present disclosure do not indicate any order, number or importance, but are only used to distinguish different components from each other. Similarly, the terms "an", "a" or the like do not indicate a limitation of quantity, but indicate "at least one". The terms "include", "contain" or the like mean that the element or object before "include" or "contain" covers the element or object listed after "include" or "contain" and the equivalent thereof, and does not exclude other elements or objects. The terms "connect", "couple" or the like are not limited to physical or mechanical connections, but may include electrical connections, regardless of direct connections or indirect connections. The terms "up", "down", "left", "right" or the like are only used to indicate a relative positional relationship, and when the absolute position of the object being described is changed, the relative positional relationship may be changed accordingly.

An embodiment of the present disclosure provides a terminal device, which may be a portable terminal device such as a smartphone, a tablet computer, and the like. In the following, components are described by taking the terminal device as a smartphone as an example.

Figure 1:
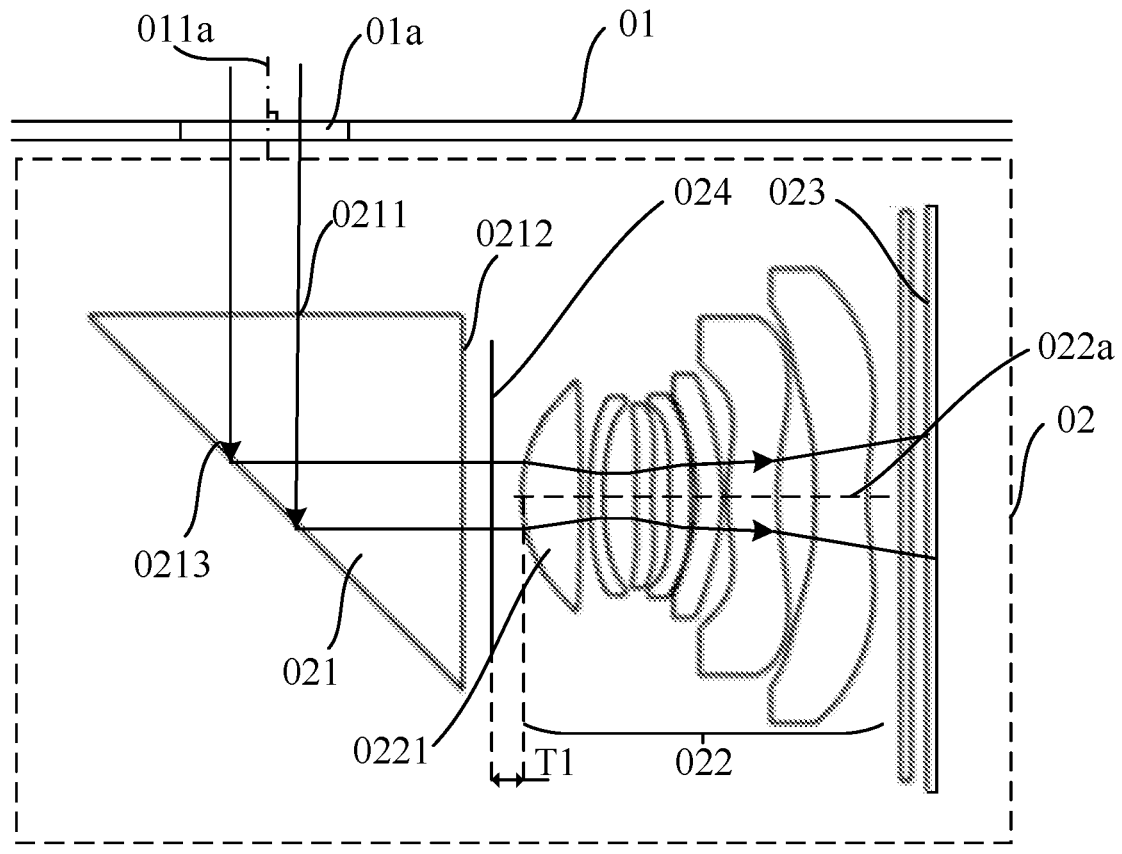
FIG. 1 is a schematic structure diagram of a terminal device according to one or more embodiments of the present disclosure.

As shown in FIG. 1, the terminal device includes a first plate body 01 and a first lens assembly 02.

In some embodiments, the first lens assembly 02 may be a rear camera of the terminal device or a front camera of the terminal device. As an example, in the case where the first lens assembly 02 is the rear camera of the terminal device, the first plate body 01 may be a back plate (i.e., a plate structure provided on a side of the terminal device that is opposite to a display surface of a display panel and used as part of the external structure of the terminal device) of the terminal device, at least part of which has a light-transmitting characteristic; and in the case where the first lens assembly 02 is the front camera of the terminal device, the first plate body 01 may be a screen cover plate (which is provided on the display panel and is used as part of the external structure of the terminal device) of the terminal device, which has a light-transmitting characteristic.

As shown in FIG. 1, the first plate body 01 has a light-transmitting area 01*a*.

As an example, the light-transmitting area 01*a* may include a light-transmitting hole through the first plate body 01. For example, the light-transmitting hole may be a circular through-hole or a square through-hole.

As an example, the first plate body 01 may be the back plate of the terminal device, and the light-transmitting area 01*a* may be formed directly on the back plate. The back plate or a portion thereof may be a glass substrate. Alternatively, as an example, the first plate body 01 may be the back plate of the terminal device, the back plate is provided with a protruding portion, and at least part of the light-transmitting area 01*a* is formed in the protruding portion. For example, the protruding portion is provided with a cover member having a light-transmitting characteristic, and the cover member forms the light-transmitting area 01*a*. For another example, the protruding portion is provided with a cover member having a light-transmitting characteristic and a through-hole formed in the protruding portion, and the cover member and the through-hole form the light-transmitting area 01*a*. As an example, the cover member may be a glass substrate.

In some embodiments, the first plate body 01 may have a rectangular plate-like structure, the light-transmitting hole is a circular through-hole, and the axis of the light-transmitting hole is perpendicular to the first plate body 01.

In this way, the processing difficulty of the light-transmitting hole may be reduced, and the assembly difficulty between the first plate body 01 and the first lens assembly 02 may be reduced.

As shown in FIG. 1, the first lens assembly 02 includes a prism 021, a lens group 022, a light-sensitive element 023, and a diaphragm 24. Light transmitted through the light-transmitting area 01*a* sequentially transmits through an object-side surface 0211 of the prism 021, an image-side surface 0212 of the prism 021 and the lens group 022 and is irradiated to the light-sensitive element 023, in which process the prism 021 is used to change the direction of propagation of the light transmitted through the light-transmitting area 01*a*.

In some embodiments, a range of the field of view of the light that transmits through the light-transmitting area 01*a*, the object-side surface 0211 of the prism 021, the image-side surface 0212 of the prism 021 and the lens group 022 and can be received by the light-sensitive element 023 is in a preset range of values. The preset range of values is greater than or equal to 55°. That is, the field of view of the first lens assembly 02 may be greater than or equal to 55°.

In this way, the first lens assembly 02 may have a large field of view range when being used, which may improve the experience feeling of the user when using the terminal device.

The prism 021 has the object-side surface 0211, the image-side surface 0212 and a reflection surface 0213. The object-side surface 0211 of the prism 021 is disposed in the light-exiting direction of the light-transmitting area 01*a*, i.e., the axis of the light-transmitting hole passes through the object-side surface 0211 of the prism 021.

The object-side surface 0211 of the prism 021 may be arranged opposite to the light-transmitting area 01*a*, so that the geometric center point of the object-side surface 0211 of the prism 021 may be on the axis of the light-transmitting hole.

In some embodiments, to ensure that the prism 021 can totally reflect light transmitted through the light-transmitting area 01*a*, the projection of the light-transmitting hole along its axial direction on the object-side surface 0211 of the prism 021 may be located entirely within the outer contour of the object-side surface 0211 of the prism 021.

As an example, as shown in FIG. 1, the prism 021 may have a triangular-prism structure, and top and bottom surfaces of the triangular-prism structure may both be isosceles right-angle triangles and parallel to each other, with each of the three sidewalls perpendicular to the top surface. The sidewalls on which the two right-angle sides of the top surface are located are the image-side surface 0211 and the object-side surface 0212 of the prism 021 respectively, and the sidewall on which the hypotenuse of the top surface is located is the reflection surface 0213 of the prism 021.

As shown in FIG. 1, the diaphragm 024, the lens group 022, and the light-sensitive element 023 are sequentially arranged in the light-exiting direction of the image-side surface 0212 of the prism 021.

The object-side surface 0211 of the prism 021 may be disposed parallel to the first plate body 01, the axis of the light-transmitting area 01*a* is perpendicular to the object-side surface 0211 of the prism 021, and the angle between the reflection surface 0213 of the prism 021 and the first plate body 01 may be 45°.

In some embodiments, referring to FIG. 1, when light is incident onto the first plate body 01 perpendicularly, the light transmitted through the light-transmitting area 01a is incident onto the object-side surface 0211 of the prism 021 perpendicularly, the reflection surface 0213 of the prism 021 reflects the incident light, and the light reflected by the reflection surface 0213 of the prism 021 transmits through the image-side surface 0212 of the prism 021 along a direction parallel to the first plate body 01. The diaphragm 024, the lens group 022, and the light-sensitive element 023 are sequentially arranged in the light-exiting direction of the image-side surface 0212 of the prism 021, and the light sequentially transmits through the diaphragm 024 and the lens group 022, and is subsequently received by the light-sensitive element 023. After the light-sensitive element 023 receives the light beam, it may process the light and thus obtain an image.

As shown in FIG. 1, the optical axis 022a of the lens group 022 is not parallel to the vertical line 011a of the light-transmitting area 1a.

When the optical axis 022a of the lens group 022 is parallel to the vertical line 011a of the light-transmitting area 1a, lenses in the lens group 022 are all parallel to the first plate body 01 which is a terminal device. In other words, the optical axis direction of the lens group 022 is the thickness direction of the terminal device, and when a larger number of lenses in the lens group 022 results in a larger size of the lens group 022 in the optical axis direction, this will result in a larger size of the terminal device in the thickness direction, which is not conducive to the miniaturization of the terminal device. When the optical axis 022a of the lens group 022 is not parallel to the vertical line 011a of the light-transmitting area 1a, the size of the lens group 022 in the thickness direction of the terminal device is equal to the component, on the vertical line of the first plate body 01, of the size of the lens group 022 in the optical axis direction, which is smaller than the size of the lens group 022 in the optical axis direction. Therefore, when the optical axis 022a of the lens group 022 is arranged to be not parallel to the vertical line 011a of the light-transmitting area 1a, it can reduce the size of the terminal device in the thickness direction to a certain extent, and is conducive to the miniaturization of the terminal device.

As an example, as shown in FIG. 1, the optical axis 022a of the lens group 022 may be perpendicular to the vertical line 011a of the light-transmitting area 01a.

In this way, since the optical axis 022a of the lens group 022 is parallel to the first plate body 01, when the size of the lens group 022 in the optical axis direction is increased, the incremental amount of the size of the lens group 022 in the optical axis direction has a zero component on the vertical line of the first plate body 01, and the size of the lens group 022 in the thickness direction of the terminal device depends only on the size of the lens in the lens group 022 in the direction perpendicular to the optical axis. When the number of lenses in the lens group 022 is large, the above structure may significantly reduce the size of the terminal device in the thickness direction, which is conducive to the miniaturization of the terminal device.

The diaphragm 024 is disposed between the lens group 022 and the image-side surface 0211 of the prism 021, i.e., the diaphragm 024 is disposed at a side of the first lens 0221 close to the image-side surface 0211 of the prism 021. The first lens 0221 is a lens in the lens group 022 that is closest to the image-side surface 0211 of the prism 021.

The diaphragm 024 has an annular structure, and an aperture diameter of a light-transmitting hole in the diaphragm 024 is D. The value of D may be set according to the actual need.

In the terminal device, an aperture coefficient F of the first lens assembly 02 satisfies $1.0 < F < 1.95$.

The aperture coefficient F is a ratio of a focal length f of the lens group 022 to the aperture diameter D of the light-transmitting hole of the diaphragm 024.

When the relative position of the lens group 022 and the diaphragm 024 is kept unchanged, the larger the aperture diameter D of the light-transmitting hole of the diaphragm 024 is, the larger the corresponding size of the prism 021 in the thickness direction of the terminal device is, the larger the amount of light emitted onto the light-sensitive element 023 through the diaphragm 024 is, and the better the imaging quality is. Correspondingly, when the relative position of the lens group 022 and the diaphragm 024 is kept unchanged, the smaller the aperture diameter D of the light-transmitting hole of the diaphragm 024 is, the smaller the corresponding size of the prism 021 in the thickness direction of the terminal device is, the smaller the amount of light emitted onto the light-sensitive element 023 through the diaphragm 024 is, and the poorer the imaging quality is. Accordingly, a person skilled in the art may set the aperture coefficient of the lens to balance the imaging quality of the lens and the size of the lens assembly in the thickness direction of the terminal device according to the actual need.

According to experimental data, in the case where the aperture coefficient F of the lens assembly satisfies $1.0 < F < 1.95$, the imaging quality of the lens can meet the demand, and at the same time, the size of the lens assembly in the thickness direction of the terminal device can be substantially reduced to adapt to the miniaturization trend of the portable terminal device.

As an example, the actual value of the aperture coefficient F of the lens assembly may be 1.61.

In some embodiments, the diaphragm 024 is disposed between the image-side surface 0212 and the lens group 022, and there is a first spacing T1 between the diaphragm 024 and the lens group 022.

Figure 4A:
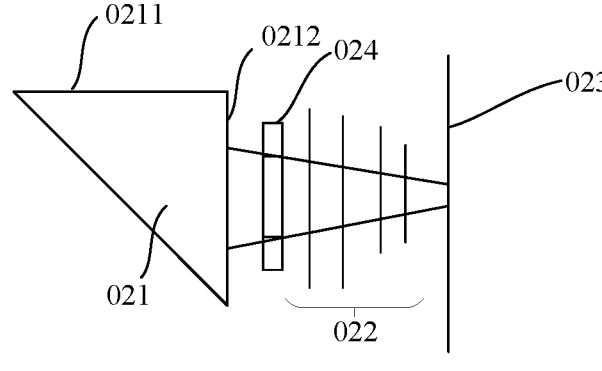
FIG. 4A is a schematic structure diagram of a lens assembly according to one or more embodiments of the present disclosure.
Figure 4B:
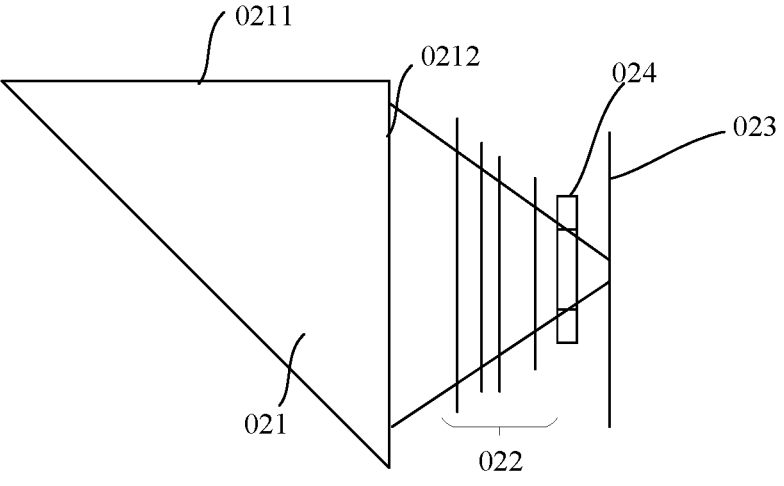
FIG. 4B is a schematic structure diagram of a lens assembly according to one or more embodiments of the present disclosure.

Referring to FIGS. 4A and 4B, when the distance from the light-sensitive element 023 to the prism 021 is equal to the aperture diameter D of the light-transmitting hole of the diaphragm 024, the structure in which the diaphragm 024 is disposed at the side of the lens group 022 close to the object-side surface 0212 of the prism 021 can efficiently reduce a required height (i.e., the size of the prism 021 in the thickness direction of the terminal device) of the prism 021, in comparison with the structure in which the diaphragm 024 is disposed at the side of the lens group 022 away from the object-side surface 0212 of the prism 021. It can be seen that in the case where the aperture diameter D of the light-transmitting hole of the diaphragm 024 does not change and the diaphragm 024 is between the light-sensitive element 023 and the object-side surface 0212 of the prism 021, the closer the diaphragm 024 is to the image-side surface 0212, the more the required height of the prism 021 can be reduced.

Accordingly, when there is the first spacing T1 between the diaphragm 024 and the first lens, it can reduce the required height of the prism 021 to adapt to the miniaturization trend of the portable terminal device.

As an example, the first spacing T1 may take a value in the range of [0, 1 mm].

Nowadays, with the technological development in the field of terminal devices, the competition in the terminal device market has become more and more intense. This competitive phenomenon is particularly obvious in the smartphone market. Currently, the smartphone tends to be miniaturized gradually. Meanwhile, for the smartphone, improving the camera performance of the mobile phone has become one of the important means for various manufacturers to enhance their competitiveness.

In the related art, a plurality of lens assemblies are usually provided in a mobile phone. Different lens assemblies are suitable for different usage scenarios, so that when a user is in different usage scenarios, different lens assemblies may be used to perform the camera function, thereby enabling the user to obtain an improved camera experience in different usage scenarios to enhance the brand competitiveness. Among the plurality of lens assemblies, a main camera is the lens assembly used to perform the camera function in the largest number of usage scenarios, and the main camera usually includes a lens group. In order to ensure the imaging quality, the number of lenses in the main camera is high, which leads to a large size of the main camera, and impedes the miniaturization of the mobile phone.

In this regard, an embodiment of the present disclosure provides a terminal device including a plurality of lens assemblies. The plurality of lens assemblies include a first lens assembly 02, and the first lens assembly 02 is the main camera among the plurality of lens assemblies in the terminal device.

As an example, the terminal device may include a telephoto camera, a wide-angle camera, and an ultra-wide-angle camera, and the main camera in the terminal device may be the wide-angle camera.

As shown in FIG. 1, the terminal device includes a first plate body 01 and a first lens assembly 02.

The first lens assembly 02 has a field of view greater than or equal to 55°.

As shown in FIG. 1, light transmitted through a light-transmitting area 01a sequentially transmits through an object-side surface 0211 of a prism 021, an image-side surface 0212 of the prism 021 and a lens group 022 and is irradiated to a light-sensitive element 023. The optical axis of the lens group 022 is not parallel to the vertical line 01a of the light-transmitting area 01a, and a diaphragm 024 is provided between the image-side surface 0212 of the prism 021 and the lens group 022.

As an example, the first plate body 01 has the light-transmitting area 01a. The first lens assembly 02 includes the prism 021, the lens group 022, and the light-sensitive element 023, the prism 021 has the object-side surface 0211 and the image-side surface 0212, and the object-side surface 0211 of the prism 021 is disposed in the light-exiting direction of the light-transmitting area 01a. The lens group 022 and the light-sensitive element 023 are sequentially arranged in the light-exiting direction of the image-side surface 0212 of the prism 021, and the optical axis 022a of the lens group 022 is not parallel to the vertical line 011a of the light-transmitting area 01a.

The specific structure of the first lens assembly 02 in the terminal device may refer to the above description, which will not be repeated here.

In the terminal device, the prism 021 of the lens assembly 02 has a first equivalent side length and a second equivalent side length which are equal to each other and both are Y1, and Y1 may satisfy 0.74Y≤Y1≤0.88Y.

When the prism 021 is a triangular-prism with a top surface of an isosceles right-angle triangle, and the object-side surface 0211 of the prism 021 is parallel to the optical axis of the lens group 022, the first equivalent side length and the second equivalent side length of the prism 021 are equal to each other and are both the length of the right-angle side of the top surface of the triangular-prism.

When the object-side surface 0211 and the image-side surface 0212 of the prism 021 may both be curved surfaces, the first equivalent side length is the length of the projection of the object-side surface 0211 of the prism 021 on the straight line where the optical axis 022a of the lens group 022 is located, and the second equivalent side length is the length of the projection of the image-side surface 0212 of the prism 021 on the optical axis of the object-side surface 0211 of the prism 021.

where $$Y = \left(\frac{Q \cdot H}{2F} + \frac{T}{2Q}\right) \cdot \frac{1}{1 - \frac{2X}{\sqrt{1 - X^2}}}; \quad X = \frac{1}{n} \cdot \frac{1}{\sqrt{1 + 4Q^2}}.$$

In an embodiment, by taking the prism 021 being a triangular-prism with a top surface of an isosceles right-angle triangle as an example (all the following takes the prism 021 being the triangular-prism with the top surface of the isosceles right-angle triangle as an example), the right-angle side length Y1 of the top surface of the prism 021 is related to an optical factor Q of the lens assembly, a refractive index n1 of the prism 021, a distance T between the object-side surface 0221a of the lens group 022 and the image-side surface 0212, a body diagonal length H of the light-sensitive element 023 and an aperture factor F of the lens assembly. A predetermined value Y for the right-angle side length of the top surface of the prism 021 may be determined by the above formula.

According to experimental data, when the right-angle side length Y1 of the top surface of the prism 021 and the predetermined value Y satisfy 0.74Y≤Y1≤0.88Y, the imaging quality of the lens assembly can meet the demand, and at the same time, the size of the lens assembly in the height direction of the terminal device can be substantially reduced to adapt to the miniaturization of the portable terminal device.

In some embodiments, the refractive index of the first lens 0221 may be n2, and the refractive index n1 of the prism 021 and the refractive index n2 of the first lens 0221 satisfy 0.83<(n1/n2)<1.7.

In this way, the height of the prism 021 and the thickness of the first lens 0221 may be reduced, thereby reducing the size of the prism 021.

In the terminal device, a ratio of a total length (TT) of the lens assembly 02 to a combined focal length f of the lens group 022 satisfies 1.6<(TT/f)<2.4.

Figure 2:
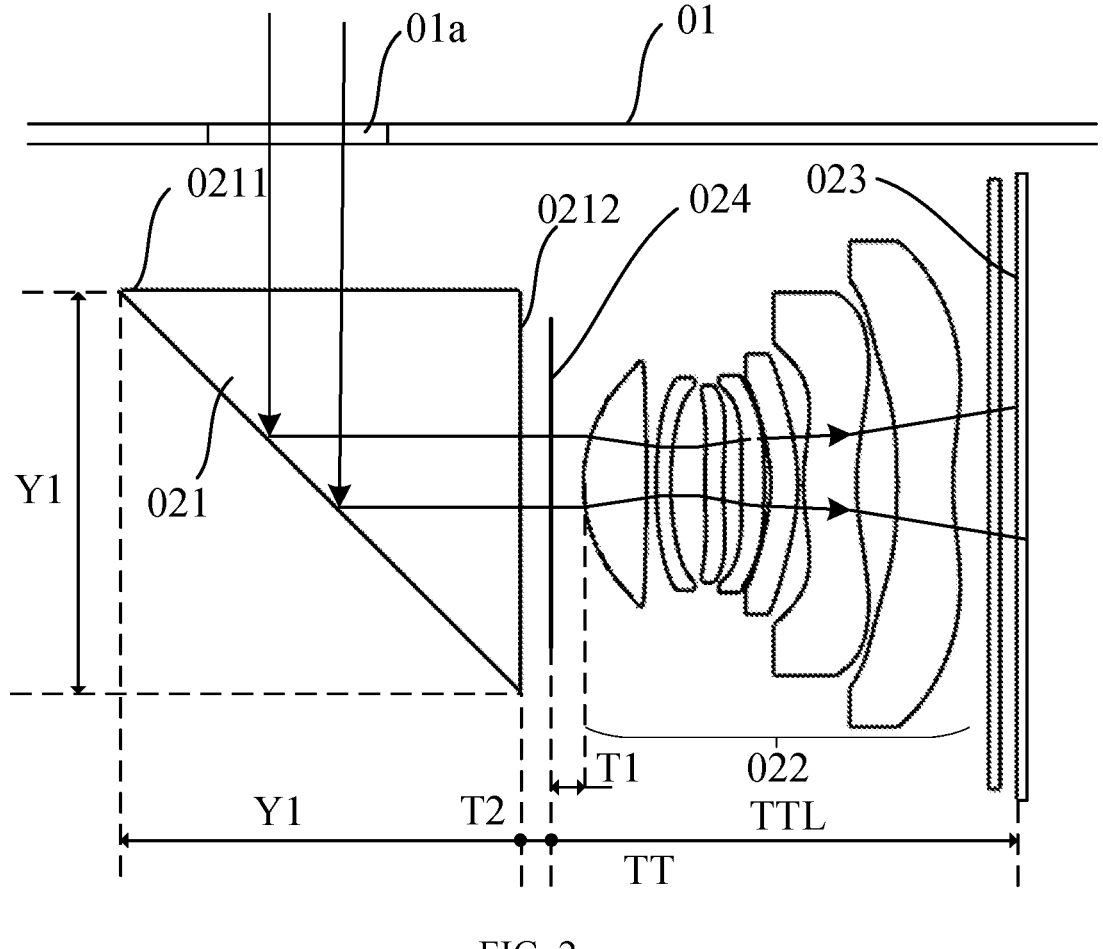
FIG. 2 is a schematic structure diagram of a terminal device according to one or more embodiments of the present disclosure.

As shown in FIG. 2, the total length (TT) of the lens assembly is a sum of the right-angle side length Y1 of the prism 021, a distance T2 from the image-side surface 0212 to the diaphragm 024, and a length TTL from the light-sensitive element 023 to the diaphragm 024.

According to experimental data, the ratio of the total length (TT) of the lens assembly to the combined focal length f of the lens group 022 is defined to be in a range of (1.6, 2.4), which can effectively reduce the size of the lens assembly in the length or width direction of the terminal device, and at the same time can satisfy the imaging requirements of the lens assembly.

In the terminal device, the ratio of the body diagonal length H of the light-sensitive element 023 of the lens assembly 02 to the total length (TT) satisfies 0.6<(H/TT)<0.9.

As shown in FIG. 2, the total length (TT) of the lens assembly is the sum of the right-angle side length Y1 of the prism 021, the distance T2 from the image-side surface 0212 to the diaphragm 024, and the length TTL from the light-sensitive element 023 to the diaphragm 024.

According to experimental data, the ratio of the body diagonal length H of the light-sensitive element 023 to the total length TT is defined to be in a range (0.6, 0.9), which can make the lens assembly more compact in the overall size, and at the same time can satisfy the imaging requirements of the lens assembly to adapt to the miniaturization of the portable terminal device.

In the terminal device, the aperture coefficient F of the lens assembly 02, the second equivalent side length Y1 of the prism 021, and the body diagonal length H of the light-sensitive element 023 satisfy the relationship $0.1 < Y1/(H \cdot F) < 0.6$.

According to experimental data, the ratio of the aperture coefficient F of the lens assembly to the product of the right-angle side length Y1 of the prism 021 and the body diagonal length H of the light-sensitive element 023 is defined to be in a range of (0.6, 0.9), which can make the lens assembly more compact in the overall size, and at the same time can satisfy the imaging requirements of the lens assembly to adapt to the miniaturization of the portable terminal device.

In the terminal device, the ratio of the first length L1 of the lens assembly 02 to the combined focal length f of the lens group 022 may satisfy $(L1/f) \geq 1.05$.

According to experimental data, in the case where the ratio of the first length L1 of the lens assembly to the combined focal length f of the lens group 022 satisfies $(L1/f) \geq 1.05$, it can satisfy the imaging requirements of the lens assembly, and at the same time, can substantially reduce the size of the lens assembly in the length or width direction of the terminal device, so as to adapt to the miniaturization of the portable terminal device.

Figure 12:
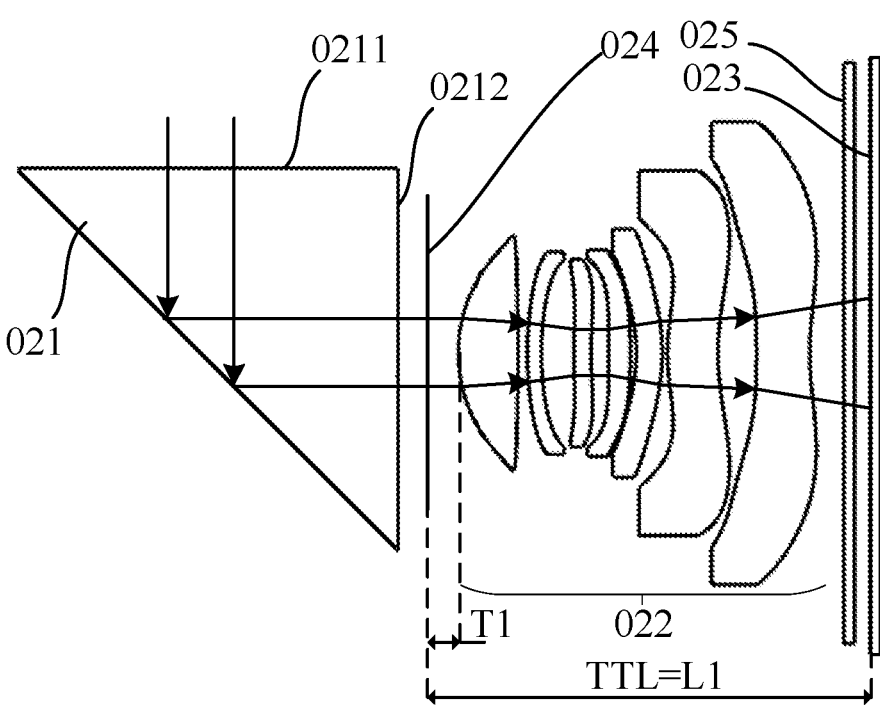
FIG. 12 is a schematic structure diagram of a lens assembly according to one or more embodiments of the present disclosure.

In an example, as shown in FIG. 12, the diaphragm 024 is disposed between the image-side surface 0212 and the first lens 0221 of the lens group 022. At this time, the first length L1 (which may also be referred to as the length TTL hereinafter) of the lens assembly is the distance from the diaphragm 024 to the light-sensitive element 023.

Figure 13:
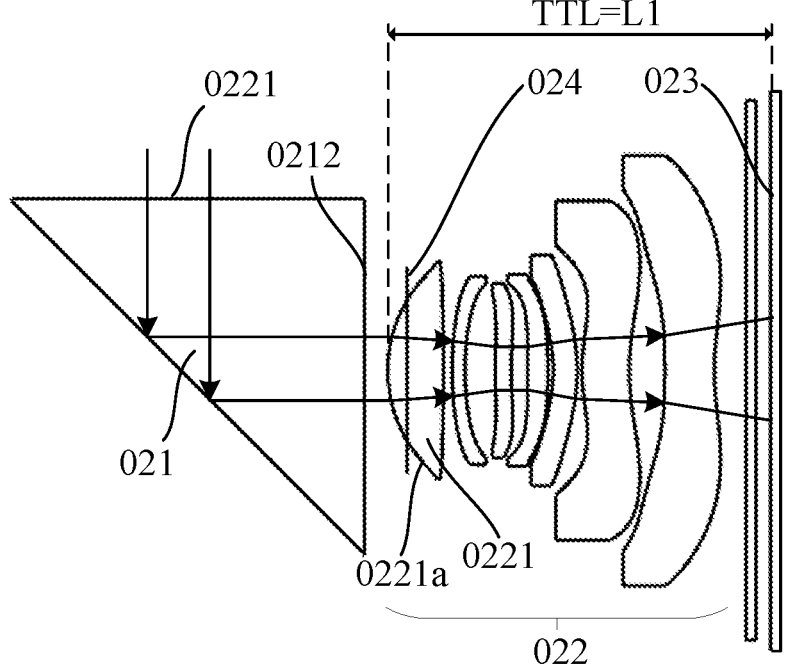
FIG. 13 is a schematic structure diagram of a lens assembly according to one or more embodiments of the present disclosure.

In another example, as shown in FIG. 13, when the diaphragm 024 is arranged around the outer circle of the object-side surface 0221a of the first lens 0221, the first length L1 (which may also be referred to as the length TTL hereinafter) of the lens assembly is the distance from the object-side surface 0221a of the first lens 0221 to the light-sensitive element 023.

The distance from the object-side surface 0221a of the first lens 0221 to the light-sensitive element 023 is the distance from a tangent plane of the object-side surface 0221a of the first lens 0221 parallel to the light-sensitive element 023 to the light-sensitive element 023.

In some embodiments, in this example, the distance from the object-side surface 0221a of the first lens 0221 to the image-side surface 0212 may be in a range of [0.02 mm, 1 mm].

According to experimental data, in the case where the distance from the object-side surface 0221a of the first lens 0221 to the image-side surface 0212 may be in the range of [0.02 mm, 1 mm], the imaging quality requirements of the lens assembly can be satisfied, and at the same time, the size of the lens assembly in the length or width direction of the terminal device can be substantially reduced to adapt to the miniaturization of the portable terminal device.

As an example, the ratio of the first length L1 of the lens assembly to the combined focal length f of the lens group 022 may be 1.4.

In the terminal device, the refractive index n1 of the prism 021 of the lens assembly 02 satisfies $n \geq 1.7$.

The refractive index n1 of the prism 021 is negatively correlated with the size of the prism 021 in the thickness direction of the terminal device. When the refractive index n1 of the prism 021 is large, the refraction ability of the prism 021 is strong, and the height of the prism 021 in the lens assembly may be small to satisfy the requirement for light refraction. When the refractive index n1 of the prism 021 is small, the refraction ability of the prism 021 is weak, and the height of the prism 021 in the lens assembly may be large to satisfy the requirement for light refraction.

In some embodiments, the refractive index of the first lens 0221 may be n2, and the refractive index n1 of the prism 021 and the refractive index n2 of the first lens 0221 satisfy $0.83 < (n1/n2) < 1.7$.

In this way, the height of the prism 021 and the thickness of the first lens 0221 can be reduced, thereby reducing the size of the lens assembly 02.

In some embodiments, the prism 021 may include a combination of materials.

As an example, the prism 021 may include a base body and a refractive index-enhancing sheet. The material of the base body may have a relatively small refractive index, and the material of the refractive index-enhancing sheet may have a relatively large refractive index.

In some embodiments, the refractive index-enhancing sheet is attached to a sidewall of the base body, and the refractive index-enhancing sheet may be adhered to the sidewall of the base body.

The material of the prism 021 may be optical glass, quartz glass, or the like. Alternatively, the material of the prism 021 may be resin, alkali halide, or the like. The material of the prism 021 is not limited to the embodiments of the present disclosure.

The technical solution provided in the embodiments of the present disclosure include at least the following beneficial effects.

Embodiments of the present disclosure provide a terminal device. In a first lens assembly of the terminal device, a diaphragm and a lens group are sequentially arranged in a direction in which light is directed from an image-side surface of the prism to a light-sensitive element, and an optical axis of the lens group is not parallel to a vertical line of a light-transmitting area. In this manner, the diaphragm is provided in front of the lens group in the direction in which the light is directed from the image-side surface of the prism to the light-sensitive element, and thus there is a large spacing between the diaphragm and the light-sensitive element. In the case where an aperture diameter of a light-transmitting hole of the diaphragm is constant, such structure can reduce the size of the prism in the thickness direction of the terminal device, and thus reduce the size of the terminal device in the thickness direction of the terminal device.

An embodiment of the present disclosure provides a lens assembly 02, which includes a prism 021, a lens group 022, a light-sensitive element 023, and a diaphragm 024, as shown in FIG. 1. With the lens assembly provided by the embodiment of the present disclosure, the size of the prism 021 in the thickness direction of the terminal device can be reduced.

FIG. 1 is a schematic diagram of a structure of a lens assembly 02 according to one or more embodiments of the present disclosure. As shown in FIG. 1, the lens assembly 02 includes a prism 021, a lens group 022, a light-sensitive element 023 and a diaphragm 024.

As shown in FIG. 1, light transmitted through the prism 021 sequentially transmits through the object-side surface 0211 of the prism 021, the image-side surface 0212 of the prism 021 and the lens group 022 and is irradiated to the light-sensitive element 023. An optical axis of the lens group 022 is not parallel to a vertical line 01a of the light-transmitting area, and the diaphragm 022 is provided between the image-side surface 0212 of the prism 021 and the lens group 022.

As an example, the prism 021 has the object-side surface 0221 and the image-side surface 0212, and the diaphragm 024, the lens group 022, and the light-sensitive element 023 may be sequentially arranged in the light-exiting direction of the image-side surface 0212 of the prism 021, and the optical axis 022a of the lens group 022 is not parallel to the optical axis of the object-side surface 0221 of the prism 021.

In the following, each part of the lens is described respectively.

I. Prism 021

The prism 021 is a component in the lens assembly to refract light.

As shown in FIG. 1 (which is a main view of the lens assembly 02), the prism 021 has a triangular-prism structure.

Top surface (referring to FIG. 1) and bottom surface of the prism 021 are two isosceles right-angle triangle which are the same, and lateral edges of the triangular-prism structure are all perpendicular to the top surface of the prism 021.

As shown in FIG. 1, by taking the top surface of the prism 021 as a reference, the top surface has two right-angle sides and a hypotenuse. The side surfaces on which the two right-angle sides are located are the object-side surface 0212 and the image-side surface 0211 of the prism 021 respectively, and the side surface on which the hypotenuse is located is the reflection surface 0213 of the prism 021.

In some embodiments, the two right-angle sides of the top surface have the same length. Correspondingly, both the object-side surface 0211 and the image-side surface 0212 of the prism 021 are at an angle of 45° to the reflection surface 0213.

In this way, as shown in FIG. 1, when light is incident vertically onto the prism 021, after the light is reflected by the reflection surface 0213, the prism 021 may transmit the light out of the image-side surface 0212 in a horizontal direction.

In some embodiments, the object-side surface 0211 and the image-side surface 0212 of the prism 021 may both be non-planar.

In an example, the object-side surface 0211 and the image-side surface 0212 of the prism 021 may both be curved and both project towards the outer normal direction of the prism 021.

In this way, the difficulty of processing the prism 021 can be reduced.

II. Lens Group 022

The lens group 022 is a component in the lens assembly to diverge or converge light.

As shown in FIG. 1, the lens group 022 is provided in the light-exiting direction of the image-side surface 0212 of the prism 021 and is opposite to the image-side surface 212.

In some embodiments, external light is incident into the prism through the object-side surface 0211, reflected towards the image-side surface 0212 through the reflection surface 0213, and subsequently emitted out of the prism 021 through the image-side surface 0212. The lens group 022 is provided in the light-exiting direction of the image-side surface 0212, which allows light emitted from the prism 021 to be incident directly into the lens group 022.

The combined focal length of the lens group 022 is f.

III. Light-Sensitive Element 023

The light-sensitive element 023 is a component in the lens assembly to convert light into an image.

As shown in FIG. 1, the light-sensitive element 023 is provided in the light-exiting direction of the prism 021 and is provided at the side of the lens group 022 away from the image-side surface 0212. That is, the light-sensitive element 023 is provided in the light-exiting direction of the lens in the lens group 022 that is furthest from the image-side surface 0212 of the prism 021.

In some embodiments, the propagation direction of the light is changed by the reflection surface of the prism 021, and the light is subsequently transmitted from the image-side surface 0212 of the prism 021 to the lens group 022. The light-sensitive element 023 is provided in the light-exiting direction of the lens group 022 to allow for a more compact structure of the lens assembly.

The light-sensitive element 023 has a rectangular plate-like structure with a body diagonal length H.

In an example, as for the lens assembly including the prism 021, the lens group 022 and the light-sensitive element 023, an optical factor Q thereof may satisfy $0.5 \leq Q \leq 0.9$.

The optical factor Q is a ratio of the combined focal length f of the lens group 022 to the body diagonal length H of the light-sensitive element 023.

Figure 14:
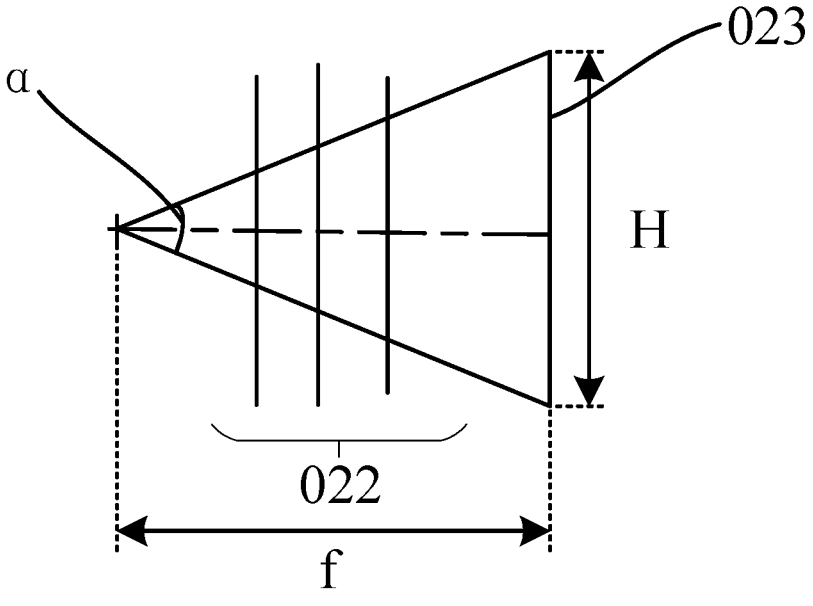
FIG. 14 is a schematic structure diagram of a lens assembly according to one or more embodiments of the present disclosure.

As shown in FIG. 14, the combined focal length of the lens group 022 is f, and the body diagonal length of the light-sensitive element 023 is H. According to the trigonometric function, if the field of view is $\alpha$, then $0.5H/f = \tan(\alpha/2)$, and according to the inverse tangent formula, $\alpha = 2 \arctan(1/(2Q))$.

In an embodiment, the optical factor Q may characterize a field of view of the lens assembly, and in the case where the optical factor Q of the lens assembly satisfies $0.5 \leq Q \leq 0.9$, the field of view of the lens assembly has a range of about 58° to 90°, and thus the lens assembly 02 has a larger range of the field of view in comparison with the usual wide-angle lens assembly with a range of field of view of about 70° to 90°. Therefore, the user may use the lens assembly 02 to take photographs in different usage scenarios.

In some possible embodiment, a person skilled in the art may adjust the optical factor Q of the lens assembly according to the requirements for the product, the field of view of the lens assembly is changed accordingly, and the adjusted field of view range of the lens assembly may be greater than or equal to 55°.

IV. Diaphragm 024

The diaphragm 024 has an annular structure, and has an aperture diameter D of a light-transmitting hole at an axial position of the diaphragm 024. The value of D may be set according to actual needs.

As shown in FIG. 1, the diaphragm 024 is provided between the image-side surface 0212 and the lens group 022.

In some embodiments, there is a first spacing T1 between the diaphragm 024 and the lens group 022, and T1>0.

Figure 3:
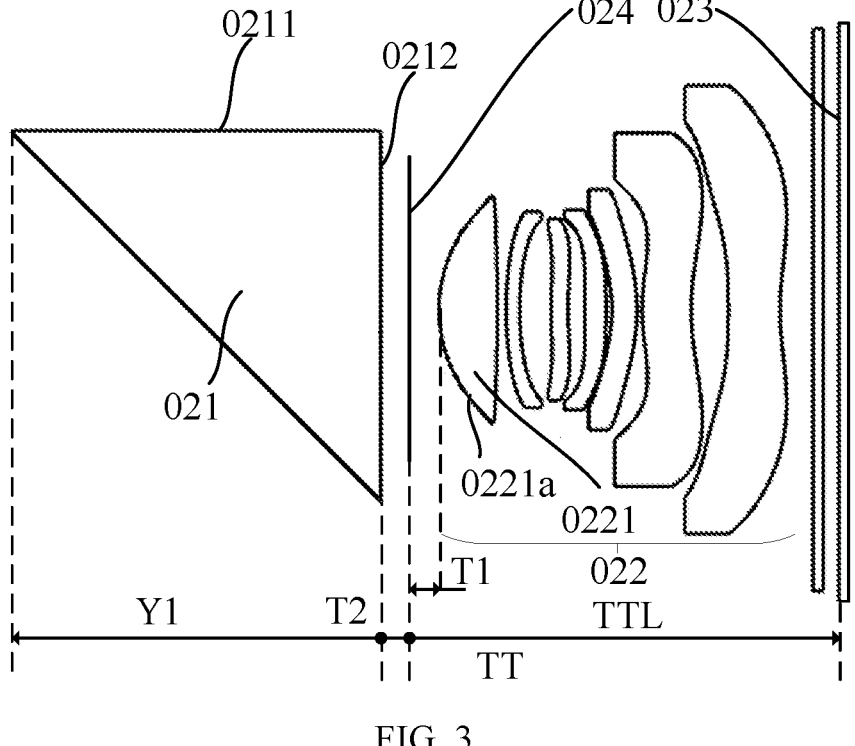
FIG. 3 is a schematic structure diagram of a lens assembly according to one or more embodiments of the present disclosure.

As shown in FIG. 3, the lens group 022 includes a group of lenses, the diaphragm 024 is provided at the side of a first lens 0221 close to the image-side surface 0212, and there is a first spacing T1 between the diaphragm 024 and an object-side surface 0221*a* of the first lens 0221.

Referring to FIGS. 4A and 4B, when the distance from the light-sensitive element 023 to the prism 021 is equal to the aperture diameter D of the light-transmitting hole of the diaphragm 024, the structure in which the diaphragm 024 is disposed at the side of the first lens 0221 in the lens group 022 close to the object-side surface 0212 of the prism 021 can efficiently reduce a required height (i.e., the size of the prism 021 in the thickness direction of the terminal device) of the prism 021, in comparison with the structure in which the diaphragm 024 is disposed at the side of the lens group 022 away from the object-side surface 0212 of the prism 021. It can be seen that in the case where the aperture diameter D of the light-transmitting hole of the diaphragm 024 does not change and the diaphragm 024 is between the light-sensitive element 023 and the object-side surface 0212 of the prism 021, the closer the diaphragm 024 is to the image-side surface 0212, the more the required height of the prism 021 can be reduced.

Accordingly, when there is the first spacing T1 between the diaphragm 024 and the first lens, it can reduce the required height of the prism 021 to adapt to the miniaturization trend of the portable terminal device.

As an example, the first spacing T1 may take a value in the range of (0, 1 mm].

In the terminal device, an aperture coefficient F of the lens assembly satisfies 1.0<F<1.95.

The aperture coefficient F is a ratio of a focal length f of the lens group 022 to the aperture diameter D of the light-transmitting hole of the diaphragm 024.

When the relative position of the lens group 022 and the diaphragm 024 is kept unchanged, the larger the aperture diameter D of the light-transmitting hole of the diaphragm 024 is, the larger the corresponding size of the prism 021 in the thickness direction of the terminal device is, the larger the amount of light emitted onto the light-sensitive element 023 through the diaphragm 024 is, and the better the imaging quality is. Correspondingly, when the relative position of the lens group 022 and the diaphragm 024 is kept unchanged, the smaller the aperture diameter D of the light-transmitting hole of the diaphragm 024 is, the smaller the corresponding size of the prism 021 in the thickness direction of the terminal device is, the smaller the amount of light emitted onto the light-sensitive element 023 through the diaphragm 024 is, and the poorer the imaging quality is. Accordingly, a person skilled in the art may set the aperture coefficient of the lens to balance the imaging quality of the lens and the size of the lens assembly in the thickness direction of the terminal device according to the actual need.

According to experimental data, in the case where the aperture coefficient F of the lens assembly satisfies 1.0<F<1.95, the imaging quality of the lens can meet the demand, and at the same time, the size of the lens assembly in the thickness direction of the terminal device can be substantially reduced to adapt to the miniaturization trend of the portable terminal device.

As an example, the actual value of the aperture coefficient F of the lens assembly may be 1.61.

Figure 5:
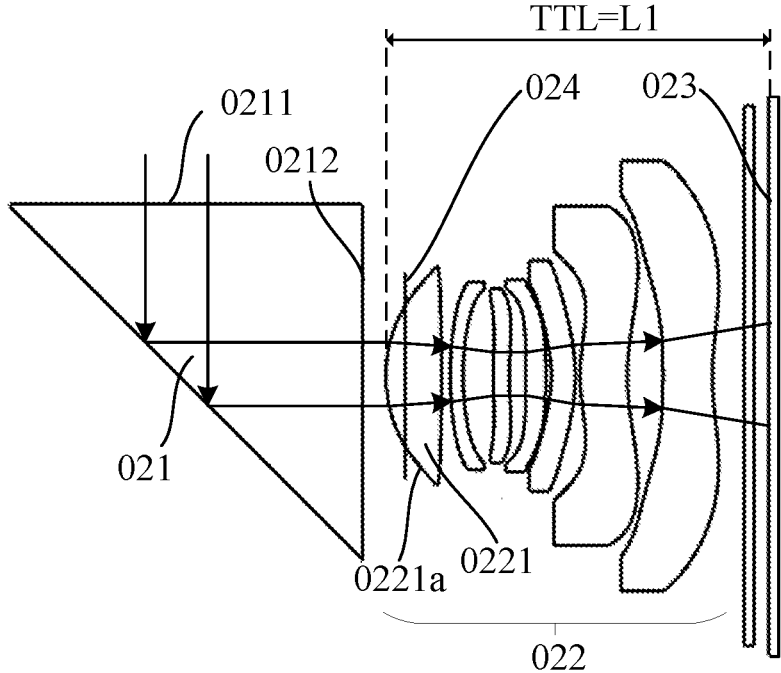
FIG. 5 is a schematic structure diagram of a lens assembly according to one or more embodiments of the present disclosure.

In an example, as shown in FIG. 5, the lens group 022 includes a first lens 0221 which is a lens in the lens group 022 close to the image-side surface 0212. The first lens 0221 has an object-side surface 0221*a* protruding toward the image-side surface 0212, and the diaphragm 024 is arranged around the outer circle of the object-side 0221*a* of the first lens 0221.

As an example, the spacing between the diaphragm 024 and the object-side surface 0221*a* of the first lens 0221 may have a value in the range of [−1 mm, 0].

In this way, the size of the lens assembly in the width or length direction of the terminal device (i.e., the size between the left and right ends of the lens assemble in FIG. 3) can be reduced.

In the following, some optional structural features of the lens assembly are described respectively.

Structural Features I. Lenses in the Lens Group 022 can all be Aspherical

As shown in FIG. 1, the lens group 022 is sequentially arranged in the light-exiting direction of the image-side surface 0212 of the prism 021, and each lens in the lens group 022 may be a convex lens or a concave lens.

For each lens in the lens group 022, a surface thereof close to the prism 021 is the object-side surface of the lens, and a surface thereof away from the prism 021 is the image-side surface of the lens. For any lens, both the object-side surface and the image-side surface thereof may be aspherical, and the surface type of the aspherical surface may be defined by formula (1):

$$z(r) = \frac{c_{bfs} \cdot r^2}{1 + \sqrt{1 - c_{bfs}^2(k+1)r^2}} + \frac{u^2 \cdot (1-u^2)\sqrt{1 - c_{bfs}^2 k r^2}}{\sqrt{1 - c_{bfs}(k+1)r^2}} \sum_{m=0}^{13} a_m Q_m(u^2) \quad (1)$$

where z denotes a depth of the aspherical surface, r denotes a distance between a specific point on the aspherical surface and the optical axis of the prism, k denotes a conic coefficient, $u=r/r_n$, $r_n$ is the normalized curvature, $a_m$ denotes the $m^{th}$ order aspherical coefficient, and $Q_m$ denotes the $m^{th}$ order polynomial.

In this way, the use of the polynomial to represent the surface type of the aspherical surface can make the surface types of the object-side surface and the image-side surface of the lens assembly more stable, therefore the object-side surface and the image-side surface are not susceptible to sudden change points, and the light, when transmitting through the prism, is not susceptible to abnormal refraction or reflection.

Figure 6:
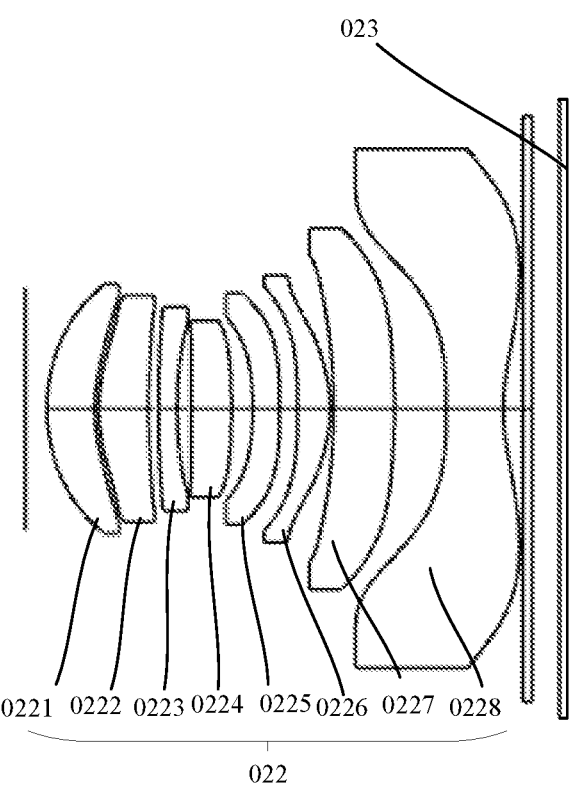
FIG. 6 is a schematic structure diagram of a lens assembly according to one or more embodiments of the present disclosure.

In an example, referring to FIG. 6 (which is a first example configuration diagram of the lens assembly), the lens group 022 includes a first lens 0221, a second lens 0222, a third lens 0223, a fourth lens 0224, a fifth lens 0225, a sixth lens 0226, a seventh lens 0227, and an eighth lens 0228. The prism 021 may be provided in the light incidence direction of the first lens 0221, and the light-sensitive element 023 may be provided in the light-exiting direction of the eighth lens 0228.

In the example, the light-sensitive element 023 has a semi-diagonal dimension of 8.166 mm, the EFL (effective focal length) of the lens assembly is 10.75 mm, the FOV (field of view) of the lens assembly is 73°, the aperture coefficient of the lens assembly is 1.69, the length of the right-angle side of the prism 021 is 12 mm, the first length L1 (also referred to as the length TTL and will be explained below) of the lens assembly is 13.567 mm, the CRA (confocal laser scanning microscope) of the lens assembly is 35, and the distance between the diaphragm 024 and the center vertex of the first lens 0221 is −1.19525 mm (a negative value means that the diaphragm 024 is provided at the side, away from the image-side surface 0212, of the center vertex of the first lens 0221, for example, at the right side of the center vertex (i.e., the leftmost point) of the first lens 0221 in FIGS. 5 and 13).

The optical characteristics of each element of the lens assembly are shown in Table 1 below, and the optical characteristics include curvature radius, element thickness or distance to a next element, refractive index, Abbe number (dispersion coefficient) and focal length.

TABLE 1

| Surface number | Element | Curvature Radius R | Thickness or Distance d | Refractive Index nd | Abbe Number vd |
|---|---|---|---|---|---|
| S0 | Prism | Infinite | 12 | 1.8 | 17 |
| S1 | | Infinite | 0.5643847 | | |
| R1 | First | 4.534712 | 1.258253 | 1.5346 | 55.695 |
| R2 | Lens | 4.205893 | 0.106086 | | |
| R3 | Second | 3.843697 | 1.322533 | 1.5346 | 55.695 |

TABLE 1-continued

| Surface number | Element | Curvature Radius R | Thickness or Distance d | Refractive Index nd | Abbe Number vd |
|---|---|---|---|---|---|
| R4 | Lens | 15.09756 | 0.2676047 | | |
| R5 | Third | 32.32809 | 0.487997 | 1.687 | 18.3 |
| R6 | Lens | 10.47083 | 0.367023 | | |
| R7 | Fourth | −26.81294 | 1.071614 | 1.5346 | 55.695 |
| R8 | Lens | −28.8094 | 0.562261 | | |
| R9 | Fifth | −9.37468 | 0.718521 | 1.687 | 18.3 |
| R10 | Lens | −25.893 | 0.465887 | | |
| R11 | Sixth | −31.0854 | 0.86487 | 1.5661 | 37.708 |
| R12 | Lens | −3.97342 | 0.106086 | | |
| R13 | Seventh | −9.26248 | 1.591294 | 1.5346 | 55.695 |
| R14 | Lens | −16.9812 | 1.379122 | | |
| R15 | Eighth | −21.065 | 1.506565 | 1.5346 | 55.695 |
| R16 | Lens | 4.9116 | 0.530432 | | |

Tables 2 and 3 below show the aspherical surface coefficients of the 16 surfaces included in the first lens 0221 to the eighth lens 0228. The first lens 0221 to the eighth lens 0228 have a total of 8 lens object-side surfaces and 8 lens image-side surfaces, which are aspherical surfaces.

TABLE 2

| Surface Number | K | A3 | A4 | A5 | A6 |
|---|---|---|---|---|---|
| R1 | 0.757836 | −0.16406 | −0.03499 | 0.01401 | 0.005478 |
| R2 | −1.31671 | −0.41811 | 0.053991 | −0.00519 | 0.00081 |
| R3 | −12.2936 | 0.034124 | −0.02587 | 0.025126 | 0.0026 |
| R4 | 7.0596 | −0.10704 | 0.0153 | 0.003603 | 0.000746 |
| R5 | 69.51327 | −0.01814 | 0.002166 | −0.00333 | 0.000263 |
| R6 | 15.64218 | −0.0443 | −0.00531 | −0.00245 | 0.000394 |
| R7 | 99.99 | −0.17428 | −0.00756 | 0.001128 | 0.000782 |
| R8 | 92.48098 | −0.21105 | −0.01186 | 0.000495 | 7.11E−05 |
| R9 | 0.572853 | −0.38276 | 0.000587 | −0.00078 | 0.000123 |
| R10 | 67.12618 | −0.61797 | 0.018343 | −0.00345 | 0.002461 |
| R11 | −90.4059 | −0.75733 | 0.031745 | 0.00311 | −0.0048 |
| R12 | −11.5981 | −0.56225 | 0.235775 | −0.02969 | −0.01667 |
| R13 | 1.215885 | 0.535049 | −0.21554 | 0.029399 | −0.02078 |
| R14 | 9.86839 | −0.48565 | −0.01082 | 0.117025 | 0.012106 |
| R15 | 0 | −2.48262 | 1.069002 | −0.0968 | −0.05353 |
| R16 | −1 | −7.77967 | 1.225412 | −0.25663 | 0.160963 |

TABLE 3

| Surface Number | A7 | A8 | A9 | A10 | A11 |
|---|---|---|---|---|---|
| R1 | −0.00244 | −0.00097 | −0.00039 | −0.00016 | −4.8E−05 |
| R2 | −0.00089 | 0.000561 | 2.45E−05 | 0.000185 | 1.416E−05 |
| R3 | 0.001876 | 0.000429 | 0.000387 | 0.000147 | 5.128E−05 |
| R4 | 0.000674 | 0.000348 | 0.000148 | 6.83E−05 | 5.104E−05 |
| R5 | 0.000147 | 0.000121 | 3.06E−05 | 2.74E−05 | −9.56E−07 |
| R6 | 2.6E−05 | 2.82E−05 | −7.5E−06 | 1.27E−05 | −3.53E−07 |
| R7 | 0.000177 | 3.74E−05 | 1.54E−05 | 6.02E−06 | 7.956E−06 |
| R8 | −4.1E−05 | −4.3E−05 | −4E−06 | −2.9E−06 | 9.236E−07 |
| R9 | 8.2E−06 | 6.43E−05 | 1.5E−05 | 1.69E−05 | 3.8E−06 |
| R10 | 0.001101 | 0.000493 | −4.6E−05 | 6.14E−05 | −1.14E−05 |
| R11 | −0.00268 | 0.00166 | −0.00136 | −5.6E−05 | 4.963E−06 |
| R12 | −0.00056 | 0.000935 | 0.000107 | 0.000366 | −7.42E−05 |
| R13 | 0.025394 | 0.002362 | 0.006738 | 0.000392 | 0.0011301 |
| R14 | 0.031778 | 0.015247 | 0.005208 | 0.000583 | −1.5E−05 |
| R15 | −0.01372 | 0.02122 | −0.00318 | −0.00142 | −0.000154 |
| R16 | −0.06373 | 0.020714 | −0.01229 | 0.005576 | −0.001519 |

Figure 7:
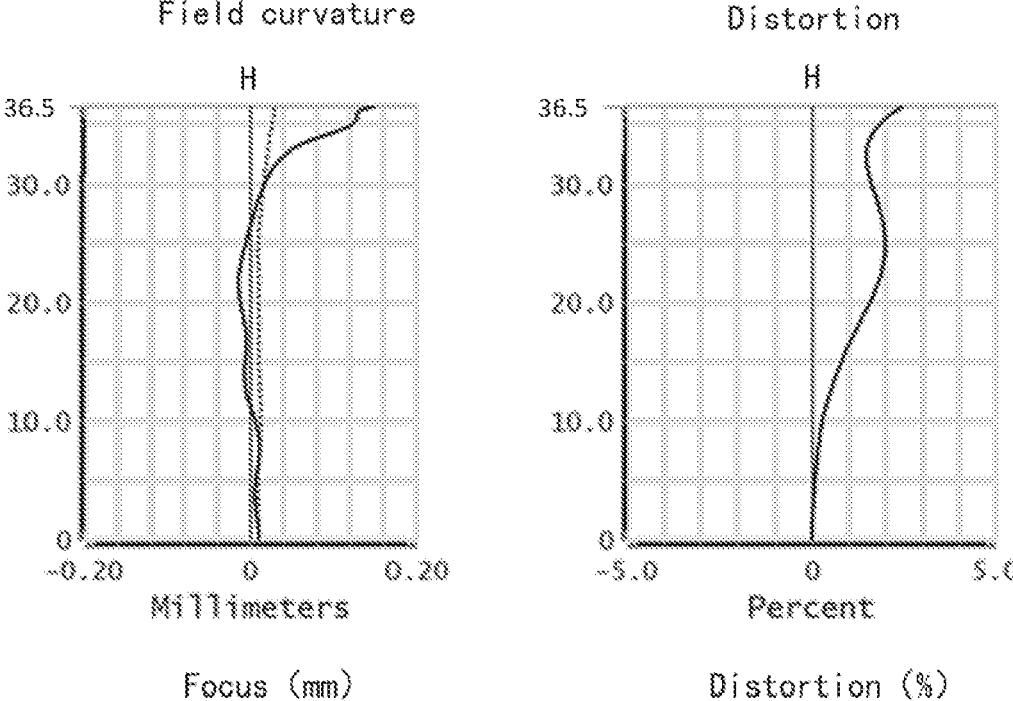
FIG. 7 is a graph of aberration characteristics of a lens assembly according to one or more embodiments of the present disclosure.

FIG. 7 illustrates a graph of aberration characteristics of the lens assembly shown in FIG. 6.

In some embodiments, the first lens 0221 may be a convex lens, and the object-side surface 0221a of the first lens 0221 and the right-angle side length Y1 of the prism 021 satisfy 0<(R1/Y1)<12.

In this way, the height of the lens assembly can be reduced.

Figure 8:
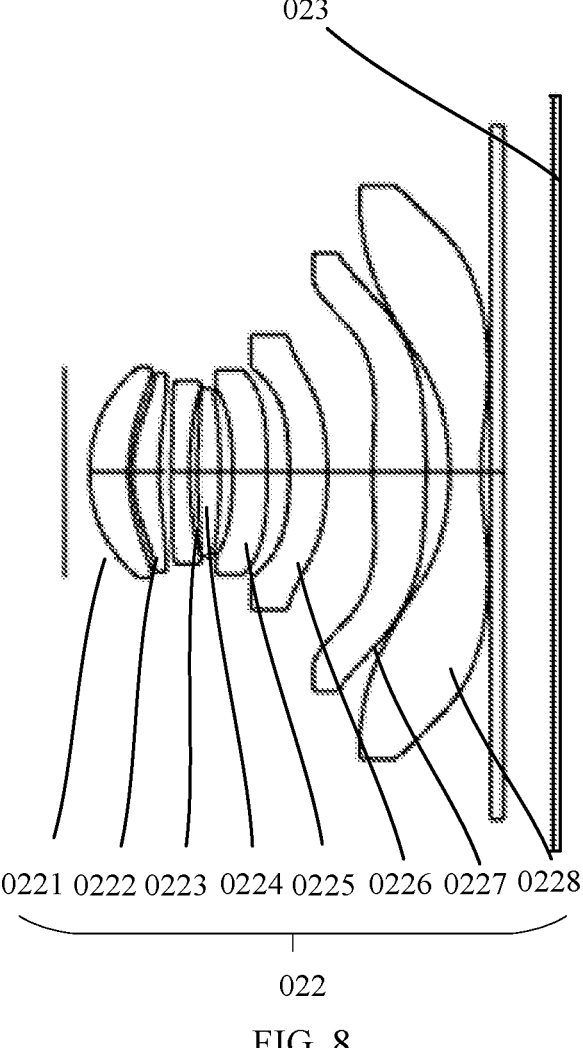
FIG. 8 is a schematic structure diagram of a lens assembly according to one or more embodiments of the present disclosure.

In an example, referring to FIG. 8 (which is a diagram of a first example configuration of a lens assembly), the lens group 022 includes a first lens 0221, a second lens 0222, a third lens 0223, a fourth lens 0224, a fifth lens 0225, a sixth lens 0226, a seventh lens 0227, and an eighth lens 0228. The prism 021 is provided in the light incidence direction of the first lens 0221, and the light-sensitive element 023 may be provided in the light-exiting direction of the eighth lens 0228.

In the example, the light-sensitive element 023 has a semi-diagonal dimension of 8.166 mm, the EFL (effective focal length) of the lens assembly is 8.955 mm, the FOV (field of view) of the lens assembly is 83°, the aperture coefficient of the lens assembly is 1.92, the length of the right-angle side of the prism 021 is 12 mm, the first length L1 (also referred to as the length TTL and will be explained below) of the lens assembly is 10.35 mm, the CRA (confocal laser scanning microscope) of the lens assembly is 35, and the distance between the diaphragm 024 and the center vertex of the first lens 0221 is −1.0496 mm (a negative value means that the diaphragm 024 is provided at the side, away from the image-side surface 0212, of the center vertex of the first lens 0221, for example, at the right side of the center vertex (i.e., the leftmost point) of the first lens 0221 in FIGS. 5 and 13).

The optical characteristics of each element of the lens assembly are shown in Table 4 below, and the optical characteristics include curvature radius, element thickness or distance to a next element, refractive index, Abbe number (dispersion coefficient) and focal length.

TABLE 4

| Surface number | Element | Curvature Radius R | Thickness or Distance d | Refractive Index nd | Abbe Number vd |
|---|---|---|---|---|---|
| S0 | Prism | Infinite | 12 | 1.8(N1) | 17 |
| S1 | | Infinite | 0.5495675 | | |
| R1 | First | 3.161849 | 0.8674344 | 1.5346 | 55.695 |
| R2 | Lens | 3.458401 | 0.1 | | |
| R3 | Second | 2.963093 | 0.5932368 | 1.5346 | 55.695 |
| R4 | Lens | 6.859363 | 0.2717754 | | |
| R5 | Third | 20.00723 | 0.4 | 1.687 | 18.3 |
| R6 | Lens | 8.212778 | 0.1819681 | | |
| R7 | Fourth | 16.981 | 0.4926637 | 1.5346 | 55.695 |
| R8 | Lens | −15.39845 | 0.2956246 | | |
| R9 | Fifth | −8.470429 | 0.7607902 | 1.687 | 18.3 |
| R10 | Lens | −19.65932 | 0.4868207 | | |
| R11 | Sixth | −10.13718 | 0.8532974 | 1.67 | 19.392 |
| R12 | Lens | −7.53181 | 1.015815 | | |
| R13 | Seventh | 13.89698 | 1.182016 | 1.5346 | 55.695 |
| R14 | Lens | −12.35334 | 0.5243996 | | |
| R15 | Eighth | −6.258918 | 0.7095259 | 1.5346 | 55.695 |
| R16 | Lens | 5.773372 | 0.2153846 | | |

Tables 5 and 6 below show the aspherical surface coefficients of the 16 surfaces included in the first lens 0221 to the eighth lens 0228. The first lens 0221 to the eighth lens 0228 have a total of 8 lens object-side surfaces and 8 lens image-side surfaces, which are aspherical surfaces.

TABLE 5

| Surface Number | K | A3 | A4 | A5 | A6 |
|---|---|---|---|---|---|
| R1 | −0.16161 | 0.069537 | 0.012707 | −0.00057 | −0.00197 |
| R2 | −7.7943 | 0.054147 | −0.02055 | −0.00418 | −0.00402 |
| R3 | −7.90166 | 0.037347 | −0.05823 | 0.006752 | 1.68E−05 |
| R4 | −23.5465 | −0.07343 | −0.0127 | 0.006118 | 0.000752 |
| R5 | 84.34346 | −0.10287 | 0.019563 | −0.0052 | −0.001 |
| R6 | 15.46519 | −0.06108 | 0.010132 | −0.00124 | 0.001349 |
| R7 | −0.71656 | −0.02863 | 0.006059 | 0.007177 | 0.0036 |
| R8 | −10.541 | −0.05083 | 0.003167 | 0.004504 | 0.001851 |
| R9 | 16.30582 | −0.08678 | 0.007963 | 0.001948 | 0.001057 |
| R10 | −96.0946 | −0.39994 | −0.01149 | 0.003101 | 0.005441 |
| R11 | −9.05065 | −0.6395 | −0.02348 | 0.012533 | 0.011585 |
| R12 | −48.8749 | −0.71856 | 0.164257 | −0.00257 | −0.00053 |
| R13 | 0 | −1.93656 | 0.121215 | 0.04609 | 0.0138 |
| R14 | 0 | −0.77372 | −0.05619 | 0.080254 | −0.03268 |
| R15 | 0 | 1.662825 | 0.765982 | 0.22831 | 0.105534 |
| R16 | −1 | −5.69207 | 0.84746 | −0.27753 | 0.140645 |

TABLE 6

| Surface Number | A7 | A8 | A9 | A10 | A11 |
|---|---|---|---|---|---|
| R1 | −0.00148 | −0.0008 | −0.00037 | −0.00014 | −3.42E−05 |
| R2 | −0.00084 | 0.000176 | 0.00024 | 8.31E−05 | 3.055E−05 |
| R3 | 0.000795 | 0.000348 | 0.000208 | 6.84E−06 | 3.113E−06 |
| R4 | −1.7E−05 | 9.35E−05 | 2.92E−05 | −3.6E−06 | 4.05E−06 |
| R5 | −0.00057 | −0.00015 | −3.5E−06 | 1.11E−05 | 8.113E−06 |
| R6 | 0.000477 | 6.95E−05 | −3.8E−07 | −1.1E−05 | −1.2E−06 |
| R7 | 0.001059 | 0.000196 | 4.91E−06 | −5E−06 | −6.32E−06 |
| R8 | 0.000442 | 8.12E−05 | 1.02E−05 | 9.49E−06 | 8.204E−06 |
| R9 | 0.000446 | 0.000182 | 8.61E−05 | 2.8E−05 | 1.403E−05 |
| R10 | 0.002961 | 0.001301 | 0.000484 | 0.000126 | 2.367E−05 |
| R11 | 0.005777 | 0.002269 | 0.00069 | 0.000142 | 4.732E−06 |
| R12 | −0.00321 | 0.000316 | 0.000159 | 0.000117 | −5.22E−05 |
| R13 | 0.004262 | −0.0058 | −0.00016 | 0.000557 | −7.91E−05 |
| R14 | 0.021735 | −0.00987 | 0.001 | 0.000831 | −0.000205 |

TABLE 6-continued

| Surface Number | A7 | A8 | A9 | A10 | A11 |
|---|---|---|---|---|---|
| R15 | 0.00332 | −0.00908 | 0.0152 | −0.00604 | 0.0029571 |
| R16 | −0.04067 | 0.017652 | −0.01094 | 3.69E−05 | 0.0005394 |

Figure 9:
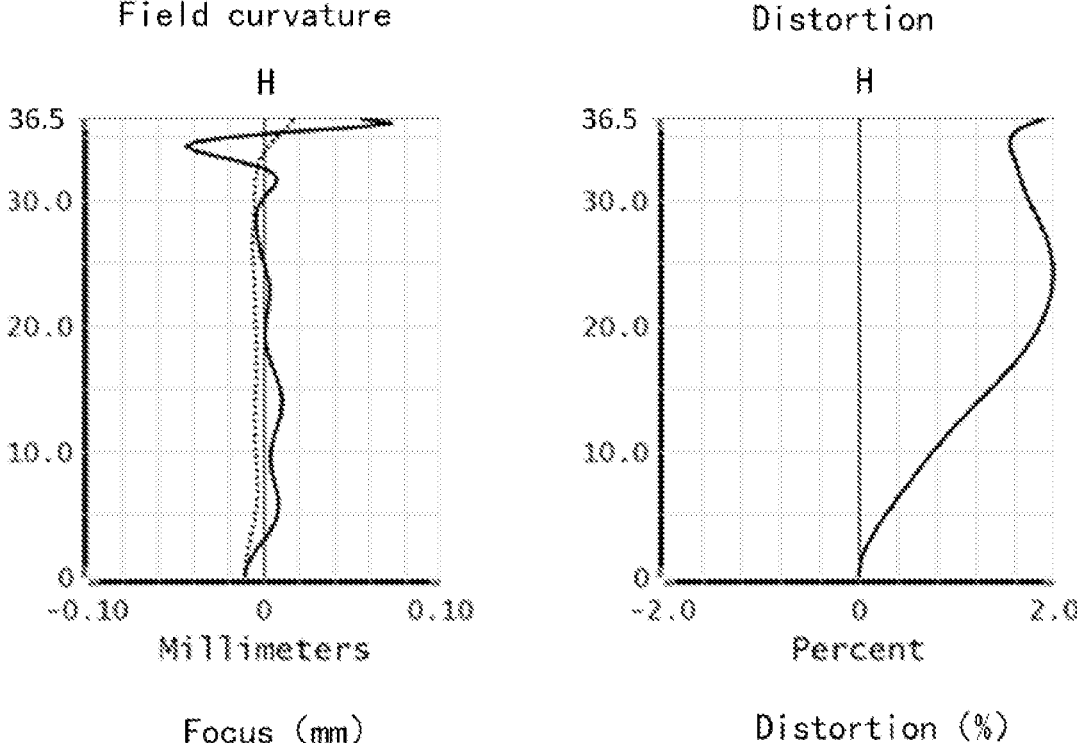
FIG. 9 is a graph of aberration characteristics of a lens assembly according to one or more embodiments of the present disclosure.

FIG. 9 illustrates a graph of aberration characteristics of the lens assembly shown in FIG. 8.

In some embodiments, the first lens 0221 may be a convex lens, and the object-side surface 0221a of the first lens 0221 and the right-angle side length Y1 of the prism 021 satisfy 0<(R1/Y1)<12.

In this way, the height of the lens assembly can be reduced.

Figure 10:
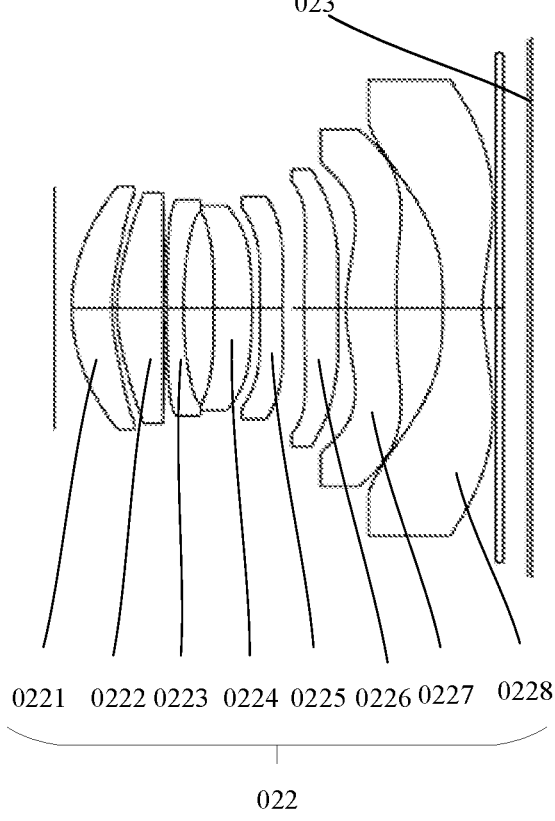
FIG. 10 is a schematic structure diagram of a lens assembly according to one or more embodiments of the present disclosure.

In an example, referring to FIG. 10 (which is a diagram of a first example configuration of a lens assembly), the lens group 022 includes a first lens 0221, a second lens 0222, a third lens 0223, a fourth lens 0224, a fifth lens 0225, a sixth lens 0226, a seventh lens 0227, and an eighth lens 0228. The prism 021 is provided in the light incidence direction of the first lens 0221, and the light-sensitive element 023 may be provided in the light-exiting direction of the eighth lens 0228.

In the example, the light-sensitive element 023 has a semi-diagonal dimension of 8.166 mm, the EFL (effective focal length) of the lens assembly is 10.805 mm, the FOV (field of view) of the lens assembly is 73°, the aperture coefficient of the lens assembly is 1.4, the length of the right-angle side of the prism 021 is 12 mm, the first length L1 (also referred to as the length TTL and will be explained below) of the lens assembly is 14.262 mm, the CRA (confocal laser scanning microscope) of the lens assembly is 35, and the distance between the diaphragm 024 and the center vertex of the first lens 0221 is 0.53469 mm (a positive value means that the diaphragm 024 is provided at the side, close to the image-side surface 0212, of the center vertex of the first lens 0221, for example, at the left side of the center vertex (i.e., the leftmost point) of the first lens 0221 in FIG. 12).

The optical characteristics of each element of the lens assembly are shown in Table 7 below, and the optical characteristics include curvature radius, element thickness or distance to a next element, refractive index, Abbe number (dispersion coefficient) and focal length.

TABLE 7

| Surface number | Element | Curvature Radius R | Thickness or Distance d | Refractive Index nd | Abbe Number vd |
|---|---|---|---|---|---|
| S0 | Prism | Infinite | 12 | 1.8 | 17 |
| S1 | | Infinite | 0.5369 | | |
| R1 | First | 5.208362 | 1.2 | 1.5346 | 55.695 |
| R2 | Lens | 5.391062 | 0.140444 | | |
| R3 | Second | 4.755838 | 1.4 | 1.5346 | 55.695 |
| R4 | Lens | 40.76421 | 0.084035 | | |
| R5 | Third | 34.72072 | 0.5 | 1.687 | 18.3 |
| R6 | Lens | 11.56838 | 0.902633 | | |
| R7 | Fourth | −109.575 | 1.144802 | 1.5346 | 55.695 |
| R8 | Lens | −26.6338 | 0.252725 | | |
| R9 | Fifth | 373.6373 | 0.660535 | 1.687 | 18.3 |
| R10 | Lens | 34.99423 | 0.65 | | |
| R11 | Sixth | 40.51407 | 1 | 1.5661 | 37.708 |
| R12 | Lens | 30.71562 | 0.250933 | | |
| R13 | Seventh | 5.780439 | 1.5 | 1.5346 | 55.695 |
| R14 | Lens | 43.95996 | 1.4 | | |
| R15 | Eighth | −15.3243 | 1.176272 | 1.5346 | 55.695 |
| R16 | Lens | 5.78945 | 0.4 | | |

Tables 8 and 9 below show the aspherical surface coefficients of the 16 surfaces included in the first lens 0221 to the eighth lens 0228. The first lens 0221 to the eighth lens 0228 have a total of 8 lens object-side surfaces and 8 lens image-side surfaces, which are aspherical surfaces.

TABLE 8

| Surface Number | K | A3 | A4 | A5 | A6 |
|---|---|---|---|---|---|
| R1 | 0.700232 | −0.4075 | −0.07115 | 0.01845 | 0.00599 |
| R2 | −1.24346 | −0.54145 | 0.102912 | −0.01518 | −0.00738 |
| R3 | −10.0968 | 0.059485 | 0.003819 | −0.00135 | −0.014 |
| R4 | 16.1405 | −0.18314 | 0.015762 | −0.00511 | −0.00034 |
| R5 | 56.37651 | 0.034813 | 0.052746 | 0.004283 | 0.000801 |
| R6 | 12.8196 | −0.07895 | 0.015713 | 0.007263 | 0.000948 |
| R7 | 62.4881 | −0.33509 | −0.00291 | 0.009338 | 0.00052 |
| R8 | 65.29741 | −0.48478 | −0.00607 | 0.010849 | −0.00251 |
| R9 | −3.47983 | −0.59091 | −0.0001 | 0.009893 | 0.001216 |
| R10 | 91.32945 | −0.71177 | 0.000262 | 0.005695 | 0.003206 |
| R11 | 96.83952 | −0.52365 | −0.11164 | −0.01757 | 0.00257 |
| R12 | −13.1112 | −1.22897 | 0.156587 | −0.02477 | 0.016902 |
| R13 | −15.558 | −1.6504 | −0.09991 | 0.077933 | 0.008548 |
| R14 | 6.81123 | −1.35335 | 0.2999 | 0.121543 | 0.03308 |
| R15 | 5.290775 | −1.34225 | 0.761562 | −0.10962 | 0.046211 |
| R16 | −1.03821 | −6.07742 | 1.070251 | −0.26529 | 0.104402 |

TABLE 9

| Surface Number | A7 | A8 | A9 | A10 | A11 |
|---|---|---|---|---|---|
| R1 | 0.00236 | −0.00066 | −7.6E−05 | 2.17E−05 | 1.074E−05 |
| R2 | −0.0014 | 0.000287 | 0.000281 | 0.000122 | 3.68E−05 |
| R3 | 0.00014 | 8.01E−05 | 0.000272 | 1.86E−05 | 3.326E−05 |
| R4 | 0.001446 | 0.000186 | 0.000242 | −4.9E−05 | 2.96E−05 |
| R5 | 0.00026 | 0.000139 | 0.000366 | 2.37E−05 | 3.989E−05 |
| R6 | −0.00074 | −0.00052 | −0.00017 | −8E−05 | −8.48E−06 |
| R7 | −0.00066 | −0.00028 | −4.6E−05 | −6.7E−06 | −5.95E−06 |
| R8 | −0.00036 | −9.8E−05 | 0.000162 | −2.7E−05 | 2.891E−06 |
| R9 | 0.001346 | 7.13E−05 | 0.000195 | −3.7E−05 | −3.07E−05 |
| R10 | 0.002489 | −0.00014 | 0.000213 | −2.2E−05 | −1.26E−05 |
| R11 | 0.003369 | −0.00162 | −0.00066 | −0.00037 | −8.7E−05 |
| R12 | 0.006484 | −0.00417 | −0.00185 | −0.00031 | 0.0001879 |
| R13 | 0.013795 | −0.00249 | −0.00182 | −0.00088 | 0.0003107 |
| R14 | 0.016604 | −0.00023 | 0.000493 | 0.001039 | −3.29E−05 |
| R15 | −0.00467 | 0.004574 | −0.00416 | 7.98E−06 | 0.000849 |
| R16 | −0.03181 | 0.021346 | −0.00604 | 0.002531 | −0.001329 |

Figure 11:
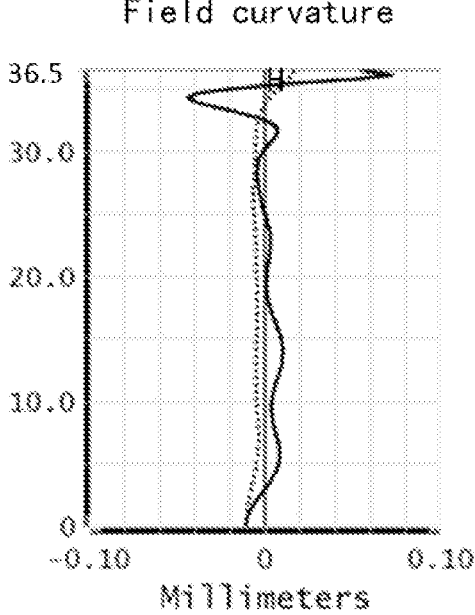
FIG. 11 is a graph of aberration characteristics of a lens assembly according to one or more embodiments of the present disclosure.

FIG. 11 illustrates a graph of aberration characteristics of the lens assembly shown in FIG. 10.

In some embodiments, the first lens 0221 may be a convex lens, and the object-side surface 0221a of the first lens 0221 and the right-angle side length Y1 of the prism 021 satisfy 0<(R1/Y1)<12.

In this way, the height of the lens assembly can be reduced.

Structural Feature II. First Equivalent Side Length and Second Equivalent Side Length of the Prism 021 are Equal to Each Other and Both are Y1, and Y1 can Satisfy 0.74Y≤Y1≤0.88Y When the prism 021 is a triangular-prism with a top surface of an isosceles right-angle triangle, and the object-side surface 0211 of the prism 021 is parallel to the optical axis of the lens group 022, the first equivalent side length and the second equivalent side length of the prism 021 are equal to each other and are both the length of the right-angle side of the top surface of the triangular-prism.

When the object-side surface 0211 and the image-side surface 0212 of the prism 021 may both be curved surfaces, the first equivalent side length is the length of the projection of the object-side surface 0211 of the prism 021 on the straight line where the optical axis 022a of the lens group 022 is located, and the second equivalent side length is the length of the projection of the image-side surface 0212 of the prism 021 on the optical axis of the object-side surface 0211 of the prism 021.

where $$Y = \left( \frac{Q \cdot H}{2F} + \frac{T}{2Q} \right) \cdot \frac{1}{1 - \frac{2X}{\sqrt{1 - X^2}}}; \quad X = \frac{1}{n} \cdot \frac{1}{\sqrt{1 + 4Q^2}}.$$

In some embodiments, by taking the prism 021 being a triangular-prism with a top surface of an isosceles right-angle triangle as an example (all the following takes the prism 021 being the triangular-prism with the top surface of the isosceles right-angle triangle as an example), the right-angle side length Y1 of the top surface of the prism 021 is related to an optical factor Q of the lens assembly, a refractive index n1 of the prism 021, a distance T between the object-side surface 0221a of the lens group 022 and the image-side surface 0212, a body diagonal length H of the light-sensitive element 023 and an aperture factor F of the lens assembly. A predetermined value Y for the right-angle side length of the top surface of the prism 021 may be determined by the above formula.

According to experimental data, when the right-angle side length Y1 of the top surface of the prism 021 and the predetermined value Y satisfy 0.74Y≤Y1≤0.88Y, the imaging quality of the lens assembly can meet the demand, and at the same time, the size of the lens assembly in the height direction of the terminal device can be substantially reduced to adapt to the miniaturization of the portable terminal device.

In some embodiments, the refractive index of the first lens 0221 may be n2, and the refractive index n1 of the prism 021 and the refractive index n2 of the first lens 0221 satisfy 0.83<(n1/n2)<1.7.

In this way, the height of the prism 021 and the thickness of the first lens 0221 may be reduced, thereby reducing the size of the prism 021.

Structural Feature III. A Ratio of a Total Length TT of the Lens Assembly 02 to a Combined Focal Length f of the Lens Group 022 Satisfies 1.6<(TT/f)<2.4

As shown in FIG. 2, the total length TT of the lens assembly is a sum of the right-angle side length Y1 of the prism 021, a distance T2 from the image-side surface 0212 to the diaphragm 024, and a length TTL from the light-sensitive element 023 to the diaphragm 024.

According to experimental data, the ratio of the total length TT of the lens assembly to the combined focal length f of the lens group 022 is defined to be in a range of (1.6, 2.4), which can effectively reduce the size of the lens assembly in the length or width direction of the terminal device, and at the same time can satisfy the imaging requirements of the lens assembly.

Structural Feature IV. A Ratio of the Body Diagonal Length H of the Light-Sensitive Element 023 to the Total Length TT Satisfies 0.6<(H/TT)<0.9

As shown in FIG. 2, the total length TT of the lens assembly is the sum of the right-angle side length Y1 of the prism 021, the distance T2 from the image-side surface 0212 to the diaphragm 024, and the length TTL from the light-sensitive element 023 to the diaphragm 024.

According to experimental data, the ratio of the body diagonal length H of the light-sensitive element 023 to the total length TT is defined to be in a range (0.6, 0.9), which can make the lens assembly more compact in the overall size, and at the same time can satisfy the imaging requirements of the lens assembly to adapt to the miniaturization of the portable terminal device.

Structural Features V. The Aperture Coefficient F of the Lens Assembly, the Second Equivalent Side Length Y1 of the Prism 021, and the Body Diagonal Length H of the Light-Sensitive Element 023 Satisfy the Relationship 0.1<Y1/(H·F)<0.6

According to experimental data, the ratio of the aperture coefficient F of the lens assembly to the product of the right-angle side length Y1 of the prism 021 and the body diagonal length H of the light-sensitive element 023 is defined to be in a range of (0.6, 0.9), which can make the lens assembly more compact in the overall size, and at the same time can satisfy the imaging requirements of the lens assembly to adapt to the miniaturization of the portable terminal device.

Structural Feature VI. The Ratio of the First Length L1 of the Lens Assembly to the Combined Focal Length f of the Lens Group 022 Satisfies (L1/f)≥1.05

According to experimental data, in the case where the ratio of the first length L1 of the lens assembly to the combined focal length f of the lens group 022 satisfies (L1/f)≥1.05, it can satisfy the imaging requirements of the lens assembly, and at the same time, can substantially reduce the size of the lens assembly in the length or width direction of the terminal device, so as to adapt to the miniaturization of the portable terminal device.

In an example, as shown in FIG. 12, the diaphragm 024 is disposed between the image-side surface 0212 and the first lens 0221 of the lens group 022. At this time, the first length L1 (which may also be referred to as the length TTL hereinafter) of the lens assembly is the distance from the diaphragm 024 to the light-sensitive element 023.

In another example, as shown in FIG. 13, when the diaphragm 024 is arranged around the outer circle of the object-side surface 0221*a* of the first lens 0221, the first length L1 (which may also be referred to as the length TTL hereinafter) of the lens assembly is the distance from the object-side surface 0221*a* of the first lens 0221 to the light-sensitive element 023.

The distance from the object-side surface 0221*a* of the first lens 0221 to the light-sensitive element 023 is the distance from a tangent plane of the object-side surface 0221*a* of the first lens 0221 parallel to the light-sensitive element 023 to the light-sensitive element 023.

In some embodiments, in this example, the distance from the object-side surface 0221*a* of the first lens 0221 to the image-side surface 0212 may be in a range of [0.02 mm, 1 mm].

According to experimental data, in the case where the distance from the object-side surface 0221*a* of the first lens 0221 to the image-side surface 0212 may be in the range of [0.02 mm, 1 mm], the imaging quality requirements of the lens assembly can be satisfied, and at the same time, the size of the lens assembly in the length or width direction of the terminal device can be substantially reduced to adapt to the miniaturization of the portable terminal device.

As an example, the ratio of the first length L1 of the lens assembly to the combined focal length f of the lens group 022 may be 1.4.

Structural Feature VII. The Refractive Index n1 of the Prism 021 of the Lens Assembly 02 Satisfies n≥1.7

The refractive index n1 of the prism 021 is negatively correlated with the size of the prism 021 in the thickness direction of the terminal device. When the refractive index n1 of the prism 021 is large, the refraction ability of the prism 021 is strong, and the height of the prism 021 in the lens assembly may be small to satisfy the requirement for light refraction. When the refractive index n1 of the prism 021 is small, the refraction ability of the prism 021 is weak, and the height of the prism 021 in the lens assembly may be large to satisfy the requirement for light refraction.

In some embodiments, the refractive index of the first lens 0221 may be n2, and the refractive index n1 of the prism 021 and the refractive index n2 of the first lens 0221 satisfy 0.83<(n1/n2)<1.7.

In this way, the height of the prism 021 and the thickness of the first lens 0221 can be reduced, thereby reducing the size of the lens assembly 02.

In some embodiments, the prism 021 may include a combination of materials.

As an example, the prism 021 may include a base body and a refractive index-enhancing sheet. The material of the base body may have a relatively small refractive index, and the material of the refractive index-enhancing sheet may have a relatively large refractive index.

In some embodiments, the refractive index-enhancing sheet is attached to a sidewall of the base body, and the refractive index-enhancing sheet may be adhered to the sidewall of the base body.

The material of the prism 021 may be optical glass, quartz glass, or the like. Alternatively, the material of the prism 021 may be resin, alkali halide, or the like. The material of the prism 021 is not limited in the embodiments of the present disclosure.

Structural Feature VIII. The Lens Assembly may Further Include an Infrared Filter 025

As shown in FIG. 12, the infrared filter 025 is provided at a side of the lens group 022 away from the image-side surface 0212, is provided between the light-sensitive element 023 and the lens group 022, and is opposite to the image-side surface 0212.

The infrared filter 025 has a thin plate-like structure. The infrared filter 025 is used to filter infrared light in the light transmitting through the lens group 022 to prevent the infrared light from being incident into the light-sensitive element 023, so as to improve the imaging quality of the lens assembly.

The material of the infrared filter 025 may be glass such as colored glass, or plastic, which is not limited in the embodiments of the present disclosure.

Structural Feature IX. The Lens Assembly is a Zoomable Lens Assembly

Below; the available manners of zooming the lens assembly are described below.

First Manner

The positions of the prism 021, the diaphragm 024, and the lens group 022 are kept unchanged, and the light-sensitive element 023 is moved in a direction away from or towards the lens group 022.

In some embodiments, the prism 021, the diaphragm 024, and the lens group 022 are fixed in a camera module, and the light-sensitive element 023 is slidingly connected to the camera module and is connected to a stepper motor, which is electrically connected to a terminal controller.

In some embodiments, the user may give a focusing command on the terminal device, and a controller controls the stepper motor to operate after receiving the focusing command to control the movement of the light-sensitive element 023 in a direction away from or towards the lens group 022, so as to achieve the focusing.

In this way, the focusing can be achieved by moving only the light-sensitive element 023, which is easy to operate.

Second Manner

The positions of the prism 021 and the light-sensitive element 023 are kept unchanged, the relative position of the diaphragm 024 and the lens group 022 is kept unchanged, and the diaphragm 024 and the lens group 022 are moved between the prism 021 and the light-sensitive element 023.

In some embodiments, the prism 021 and the light-sensitive element 023 are fixed in the camera module, the diaphragm 024 and the lens group 022 are slidingly connected to the camera module and connected to the stepper motor, and the stepper motor is electrically connected to the terminal controller.

In some embodiments, the user may give a focusing command on the terminal, and the controller controls the stepper motor to operate after receiving the focusing command to move the diaphragm 024 and the lens group 022 between the prism 021 and the light-sensitive element 023, so as to achieve the focusing.

In this way, there is no need to reserve the moving distance of the light-sensitive element 023, and the size of the lens assembly in the length or width direction of the terminal device can be reduced.

Third Manner

The positions of the prism 021, the diaphragm 024, and the light-sensitive element 023 are kept unchanged, the relative position of the lenses in the lens group 022 is kept unchanged, and the lens group 022 is moved between the diaphragm 024 and the light-sensitive element 023.

In some embodiments, the prism 021, the diaphragm 024, and the light-sensitive element 023 are fixed in the camera module, and the lens group 022 is slidingly connected to the camera module and connected to the stepper motor, and the stepper motor is electrically connected to the terminal controller.

In some embodiments, the user may give a focusing command on the terminal, and the controller controls the stepper motor to operate after receiving the focusing command to move the lens group 022 between the diaphragm 024 and the light-sensitive element 023, so as to achieve the focusing.

In this way, the diaphragm 024 is not needed to be moved, which can improve the imaging quality of the lens assembly.

The above structural features can be used individually or in combination.

An embodiment of the present disclosure provides a camera module that includes the lens assembly 02 described above.

The foregoing are only embodiments of the present disclosure, and are not intended to limit the present disclosure, and any modifications, equivalent substitutions, improvements or the like made within the spirit and principle of the present disclosure shall be included in the protection scope of the present disclosure.

What is claimed is:

1. A terminal device, comprising:

a first plate body and a first lens assembly, wherein the first plate body has a light-transmitting area;

the first lens assembly comprises a prism, a lens group, a light-sensitive element, and a diaphragm, the prism having an object-side surface and an image-side surface, a light transmitted through the light-transmitting area sequentially transmitting through the object-side surface of the prism, the image-side surface of the prism, and the lens group, and being irradiated to the light-sensitive element, and an optical axis of the lens group being not parallel to a vertical line of the light-transmitting area; and the diaphragm is provided between the image-side surface of the prism and the lens group, wherein the prism has a first equivalent side length and a second equivalent side length which are equal to each other, the first equivalent side length is a length of projection of the object-side surface of the prism on a line where the optical axis of the lens group is located, and the second equivalent side length is a length of projection of the image-side surface of the prism on the vertical line of the light-transmitting area, wherein a ratio of a total length TT of the first lens assembly to a combined focal length f of the lens group satisfies $1.6 < (TT/f) < 2.4$,, and wherein a length of the first equivalent side length is Y1, and the total length TT of the first lens assembly is a sum of the first equivalent side length Y1, a distance T2 from the diaphragm to the image-side surface of the prism, and a distance TTL from the diaphragm to the light-sensitive element.

2. The terminal device according to claim 1, wherein the vertical line of the light-transmitting area is perpendicular to the first plate body, and the optical axis of the lens group is perpendicular to the vertical line of the light-transmitting area.

3. The terminal device according to claim 1, wherein a body diagonal length H of the light-sensitive element and the total length TT of the first lens assembly satisfy $0.6 < (H/TT) < 0.9$.

4. The terminal device according to claim 1, wherein an optical factor Q of the first lens assembly satisfies $0.5 \leq Q \leq 0.9$, and wherein the optical factor Q is a ratio of the combined focal length f of the lens group to a body diagonal length H of the light-sensitive element.

5. The terminal device according to claim 1, wherein a length of the second equivalent side length is Y2, and an aperture coefficient F of the first lens assembly, the second equivalent side length Y2 of the prism and a body diagonal length H of the light-sensitive element satisfy $0.1 < Y2/(H \cdot F) < 0.6$, and wherein the aperture coefficient F is a ratio of the combined focal length f of the lens group to an aperture diameter D of a light-transmitting hole of the diaphragm.

6. The terminal device according to claim 1, wherein a length of the second equivalent side length is Y2, a first lens in the lens group closest to the image-side surface of the prism has an object-side surface protruding towards the image-side surface of the prism, and a radius of curvature R1 of the object-side surface of the first lens and the second equivalent side length Y2 of the prism satisfy 0<(R1/Y2) <12.

7. The terminal device according to claim 1, wherein a refractive index of the prism is a first refractive index n1, a refractive index of the first lens in the lens group closest to the image-side surface of the prism is a second refractive index n2, and the first refractive index n1 and the second refractive index n2 satisfy 0.83<(n1/n2)<1.7.

8. The terminal device according to claim 1, wherein a first spacing T1 between the diaphragm and the lens group satisfies T1>0.

9. The terminal device according to claim 1, wherein the prism comprises a base body and a refractive index-enhancing sheet, the refractive index-enhancing sheet being attached to a sidewall of the base body, a material of the base body has a refractive index smaller than a refractive index of a material of the refractive index-enhancing sheet.

10. The terminal device according to claim 1, wherein each of the object-side surface and the image-side surface of the prism is curved and protrudes towards an outer normal direction of the prism.

11. The terminal device according to claim 1, wherein positions of the prism and the light-sensitive element are kept unchanged in the first lens assembly, a relative position of the diaphragm and the lens group is kept unchanged, and the diaphragm and the lens group are movable together between the prism and the light-sensitive element.

12. A lens assembly, comprising: a prism, a lens group, a light-sensitive element, and a diaphragm, wherein the prism has an object-side surface and an image-side surface;

a light transmitted through the prism sequentially transmits through the object-side surface of the prism, the image-side surface of the prism, and the lens group, and is irradiated to the light-sensitive element, and an optical axis of the lens group is not parallel to an optical axis of the object-side surface of the prism; and the diaphragm is provided between the image-side surface of the prism and the lens group, wherein the prism has a first equivalent side length and a second equivalent side length which are equal to each other, the first equivalent side length is a length of projection of the object-side surface of the prism on a line where the optical axis of the lens group is located, and the second equivalent side length is a length of projection of the image-side surface of the prism on the optical axis of the object-side surface of the prism wherein a ratio of a total length TT of the lens assembly to a combined focal length f of the lens group satisfies 1.6<(TT/f)<2.4, and wherein a length of the first equivalent side length is Y1, and the total length TT of the lens assembly is a sum of the first equivalent side length Y1, a distance T2 from the diaphragm to the image-side surface of the prism, and a distance TTL from the diaphragm to the light-sensitive element.

13. The lens assembly according to claim 12, wherein the prism comprises a base body and a refractive index-enhancing sheet, the refractive index-enhancing sheet is attached to a sidewall of the base body, a material of the base body has a refractive index smaller than a refractive index of a material of the refractive index-enhancing sheet.

14. The lens assembly according to claim 12, wherein a body diagonal length H of the light-sensitive element and the total length TT of the lens assembly satisfy 0.6<(H/TT) <0.9.

15. The lens assembly according to claim 12, wherein an optical factor Q of the lens assembly satisfies 0.5≤Q≤0.9, and wherein the optical factor Q is a ratio of the combined focal length f of the lens group to a body diagonal length H of the light-sensitive element.

16. The lens assembly according to claim 12, wherein a length of the second equivalent side length is Y2, and an aperture coefficient F of the lens assembly, the second equivalent side length Y2 of the prism and a body diagonal length H of the light-sensitive element satisfy 0.1<Y2/(H·F) <0.6, and wherein the aperture coefficient F is a ratio of the combined focal length f of the lens group to an aperture diameter D of a light-transmitting hole of the diaphragm.

17. The lens assembly according to claim 12, wherein a length of the second equivalent side length is Y2, a first lens in the lens group closest to the image-side surface of the prism has an object-side surface protruding towards the image-side surface of the prism, and a radius of curvature R1 of the object-side surface of the first lens and the second equivalent side length Y2 of the prism satisfy 0<(R1/Y2) <12.

18. The lens assembly according to claim 12, wherein a refractive index of the prism is a first refractive index n1, a refractive index of a first lens in the lens group closest to the image-side surface of the prism is a second refractive index n2, and the first refractive index n1 and the second refractive index n2 satisfy 0.83<(n1/n2)<1.7.

19. The lens assembly according to claim 12, wherein a first spacing T1 between the diaphragm and the lens group satisfies T1>0.

20. A camera module, comprising a lens assembly which comprises a prism, a lens group, a light-sensitive element, and a diaphragm, wherein the prism has an object-side surface and an image-side surface;

a light transmitted through the prism sequentially transmits through the object-side surface of the prism, the image-side surface of the prism, and the lens group and is irradiated to the light-sensitive element, and an optical axis of the lens group is not parallel to an optical axis of the object-side surface of the prism; and the diaphragm is provided between the image-side surface of the prism and the lens group, wherein the prism has a first equivalent side length and a second equivalent side length which are equal to each other, the first equivalent side length is a length of projection of the object-side surface of the prism on a line where the optical axis of the lens group is located, and the second equivalent side length is a length of projection of the image-side surface of the prism on the optical axis of the object-side surface of the prism wherein a ratio of a total length TT of the lens assembly to a combined focal length f of the lens group satisfies 1.6<(TT/f)<2.4, and wherein a length of the first equivalent side length is Y1, and the total length TT of the lens assembly is a sum of the first equivalent side length Y1, a distance T2 from the diaphragm to the image-side surface of the prism, and a distance TTL from the diaphragm to the light-sensitive element.

* * * * *